US011948032B2

(12) United States Patent
Kataoka

(10) Patent No.: US 11,948,032 B2
(45) Date of Patent: Apr. 2, 2024

(54) NONCONTACT COMMUNICATION MEDIUM, MAGNETIC TAPE CARTRIDGE, METHOD FOR OPERATING NONCONTACT COMMUNICATION MEDIUM, AND PROGRAM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/056,718

(22) Filed: Nov. 18, 2022

(65) Prior Publication Data
US 2023/0080645 A1 Mar. 16, 2023

Related U.S. Application Data

(63) Continuation of application No. PCT/JP2021/018099, filed on May 12, 2021.

(30) Foreign Application Priority Data

May 25, 2020 (JP) ................................ 2020-090928

(51) Int. Cl.
G06K 19/073 (2006.01)
G11B 5/008 (2006.01)

(52) U.S. Cl.
CPC ........ *G06K 19/073* (2013.01); *G11B 5/00813* (2013.01)

(58) Field of Classification Search
CPC ..... G11B 23/107; G11B 5/02; G11B 20/0092; G11B 23/042; G11B 27/11; G06K 19/07; G06K 19/073; G06K 19/077
See application file for complete search history.

(56) References Cited

U.S. PATENT DOCUMENTS 9,640,209 B1 * 5/2017 Bui .................... G11B 20/1816
10,475,477 B1 * 11/2019 Biskeborn .......... G11B 5/00813
(Continued)

FOREIGN PATENT DOCUMENTS

JP 2002-352554 A 12/2002
JP 2009-230504 A 10/2009
(Continued)

OTHER PUBLICATIONS

JP2009230504A Magnetic Sheet Creation Device, 23 Pages. (Year: 2023).*

(Continued)

*Primary Examiner* — Tuyen K Vo
(74) *Attorney, Agent, or Firm* — SOLARIS Intellectual Property Group, PLLC

(57) ABSTRACT

A noncontact communication medium includes a processor, and a memory incorporated in or connected to the processor, and performs noncontact communication with an external communication device. The memory has a storage block where information determined depending on a specification of a magnetic tape cartridge, in which the noncontact communication medium is mounted, is stored, and the storage block has an identifier storage field. The processor is configured to write an identifier given from the external communication device to the noncontact communication medium, in the identifier storage field, and execute locking processing of locking the identifier storage field in response to a specific command given from the external communication device to the noncontact communication medium.

10 Claims, 21 Drawing Sheets

(56) References Cited

U.S. PATENT DOCUMENTS

| | | | |
|---|---|---|---|
| 2011/0176238 A1* | 7/2011 | Shiratori | G11B 27/107 |
| 2021/0012804 A1 | 1/2021 | Nakashio et al. | |
| 2021/0217441 A1 | 7/2021 | Nakashio et al. | |
| 2021/0233567 A1* | 7/2021 | Tochikubo | G11B 15/43 |
| 2021/0241794 A1* | 8/2021 | Kataoka | G11B 5/00813 |
| 2021/0242906 A1* | 8/2021 | Kataoka | H02J 50/005 |
| 2021/0375317 A1* | 12/2021 | Nakano | G11B 23/087 |
| 2022/0254370 A1* | 8/2022 | Yamaga | G11B 23/107 |

FOREIGN PATENT DOCUMENTS

| | | |
|---|---|---|
| JP | 2010-015461 A | 1/2010 |
| WO | 2019/176325 A1 | 9/2019 |
| WO | 2019/193829 A1 | 10/2019 |

OTHER PUBLICATIONS

WO2019176325A1 Non-Contact Communication Medium, Recording Medium Cartridge, Driving Method for Non-Contact Communication Medium and Program, 12 Pages. (Year: 2023).*

International Search Report issued in International Application No. PCT/JP2021/018099 dated Jun. 29, 2021.

Written Opinion of the ISA issued in International Application No. PCT/JP2021/018099 dated Jun. 29, 2021.

English language translation of the following: Explanation of Circumstances Concerning Accelerated Examination filed on Jul. 10, 2020 in a Japanese patent application No. 2020-090928 corresponding to the instant patent application.

English language translation of the following: Office action dated Aug. 5, 2020 from the JPO in a Japanese patent application No. 2020-090928 corresponding to the instant patent application.

English language translation of the following: Explanation of Circumstances Concerning Accelerated Examination filed on Nov. 18, 2020 in a Japanese patent application No. 2020-192021 corresponding to the instant patent application.

English language translation of the following: Office action dated Dec. 4, 2020 from the JPO in a Japanese patent application No. 2020-192021 corresponding to the instant patent application.

* cited by examiner

NONCONTACT COMMUNICATION MEDIUM, MAGNETIC TAPE CARTRIDGE, METHOD FOR OPERATING NONCONTACT COMMUNICATION MEDIUM, AND PROGRAM

CROSS-REFERENCE TO RELATED APPLICATIONS

This application is a continuation application of International Application No. PCT/JP2021/018099, filed May 12, 2021, the disclosure of which is incorporated herein by reference in its entirety. Further, this application claims priority from Japanese Patent Application No. 2020-090928, filed May 25, 2020, the disclosure of which is incorporated herein by reference in its entirety.

BACKGROUND

1. Technical Field

A technique of the present disclosure relates to a noncontact communication medium, a magnetic tape cartridge, a method for operating a noncontact communication medium, and a program.

2. Related Art

WO2019/193829A discloses a cartridge memory for a recording medium cartridge. The cartridge memory described in WO2019/193829A comprises a memory unit and a capacity setting unit. In the cartridge memory described in WO2019/193829A, the memory unit has a memory capacity capable of storing management information regarding a second information recording medium configured to be capable of recording information with a second data track number greater than a first data track number. The capacity setting unit is configured to be capable of setting a data storage region limited to a first capacity capable of storing management information regarding a first information recording medium configured to be capable of recording information with the first data track number, in the memory unit. The capacity setting unit is configured to be capable of expanding the data storage region limited to the first capacity to a second capacity capable of storing the management information regarding the second information recording medium.

SUMMARY

By the way, since even magnetic tape cartridges of different standards, such as Linear Tape Open (LTO) and International Business Machines Corporation (IBM) 3592, have the same specification, there is a case where a cartridge memory in which common information is stored can be charged in a production process of LTO and a production process of IBM3592.

Note that, in a stage before the cartridge memory is incorporated in the magnetic tape cartridge, even in a case where the cartridge memory can be shared by the LTO and the IBM3592, at the time of manufacturing of the cartridge memory, an identifier (for example, a serial number for manufacturing) determined by a vendor of the cartridge memory is shared between the LTO and the IBM3592.

Normally, in the stage before the cartridge memory is incorporated in the magnetic tape cartridge, the identifier that is stored in the cartridge memory is fixed in an unrewritable state. Thus, the identifier cannot be rewritten by a vendor of the magnetic tape cartridge. Furthermore, the identifier is a consecutive number and has a limited number of digits. Thus, in a case where the identifier is distributed to magnetic tape cartridges of different standards, a consecutive number that is used as an identifier is short.

An embodiment according to the technique of the present disclosure provides a noncontact communication medium, a magnetic tape cartridge, a method for operating a noncontact communication medium, and a program capable of fixing an identifier determined by a vendor of a magnetic tape cartridge at a timing intended by the vendor of the magnetic tape cartridge.

A first aspect according to the technique of the present disclosure is a noncontact communication medium comprising a processor, and a memory incorporated in or connected to the processor, in which the noncontact communication medium performs noncontact communication with an external communication device, the memory has a storage block where information determined depending on a specification of a magnetic tape cartridge, in which the noncontact communication medium is mounted, is stored, the storage block has an identifier storage field where an identifier capable of specifying the noncontact communication medium is stored, and the processor is configured to write the identifier given from the external communication device to the noncontact communication medium by noncontact communication, in the identifier storage field, and execute locking processing of locking the identifier storage field in response to a specific command given from the external communication device to the noncontact communication medium by the noncontact communication.

A second aspect according to the technique of the present disclosure is the noncontact communication medium according to the first aspect, in which the locking processing is processing of locking the storage block to lock the identifier storage field.

A third aspect according to the technique of the present disclosure is the noncontact communication medium according to the second aspect, in which the storage block is changed to a readout-dedicated block through the locking processing by the processor.

A fourth aspect according to the technique of the present disclosure is the noncontact communication medium according to any one of the first aspect to the third aspect, in which the processor is configured to change the identifier in the identifier storage field in response to an instruction given from the external communication device to the noncontact communication medium by the noncontact communication in a case where the identifier is stored in the identifier storage field in a stage before the locking processing is executed.

A fifth aspect according to the technique of the present disclosure is the noncontact communication medium according to any one of the first aspect to the fourth aspect, in which the processor is configured to store an error detection code for information including the identifier stored in the memory, in the memory in response to the specific command, and execute the locking processing under a condition that the error detection code is stored in the memory.

A sixth aspect according to the technique of the present disclosure is the noncontact communication medium according to any one of the first aspect to the fifth aspect, in which the storage block is a block having the identifier storage field, an error detection code storage field where a code for error detection for information including the identifier is stored, a storage capacity-related information storage field where information regarding a storage capacity of the memory is stored, and a model-related information storage field where information regarding a model of the noncontact communication medium is stored.

A seventh aspect according to the technique of the present disclosure is the noncontact communication medium according to any one of the first aspect to the sixth aspect, in which the processor is configured to switch between on and off of a flag indicating permission of the locking processing in response to an instruction given from an outside.

An eighth aspect according to the technique of the present disclosure is the noncontact communication medium according to any one of the first aspect to the seventh aspect, in which the locking processing is executed in a stage where manufacturing of the magnetic tape cartridge ends, a stage where inspection of the magnetic tape cartridge ends, or a stage where the magnetic tape cartridge is shipped.

A ninth aspect according to the technique of the present disclosure is a magnetic tape cartridge comprising the noncontact communication medium according to any one of the first aspect to the eighth aspect, and a magnetic tape, in which the memory stores management information regarding the magnetic tape.

A tenth aspect according to the technique of the present disclosure is a method for operating a noncontact communication medium that includes a memory incorporated in or connected to a processor and performs noncontact communication with an external communication device, in which the memory has a storage block where information determined depending on a specification of a magnetic tape cartridge, in which the noncontact communication medium is mounted, is stored, and the storage block has an identifier storage field where an identifier capable of specifying the noncontact communication medium is stored, the method comprising writing the identifier given from the external communication device to the noncontact communication medium by the noncontact communication in the identifier storage field, and executing locking processing of locking the identifier storage field in response to a specific command given from the external communication device to the noncontact communication medium by the noncontact communication.

An eleventh aspect according to the technique of the present disclosure is a program causing a computer, which is applied to a noncontact communication medium that includes a memory incorporated in or connected to a processor and performs noncontact communication with an external communication device, to execute a process, in which the memory has a storage block where information determined depending on a specification of a magnetic tape cartridge, in which the noncontact communication medium is mounted, is stored, and the storage block has an identifier storage field where an identifier capable of specifying the noncontact communication medium is stored, the process comprising writing the identifier given from the external communication device to the noncontact communication medium by the noncontact communication in the identifier storage field, and executing locking processing of locking the identifier storage field in response to a specific command given from the external communication device to the noncontact communication medium by the noncontact communication.

BRIEF DESCRIPTION OF THE DRAWINGS

Exemplary embodiments of the technology of the disclosure will be described in detail based on the following figures, wherein.

DETAILED DESCRIPTION

Figure 1:
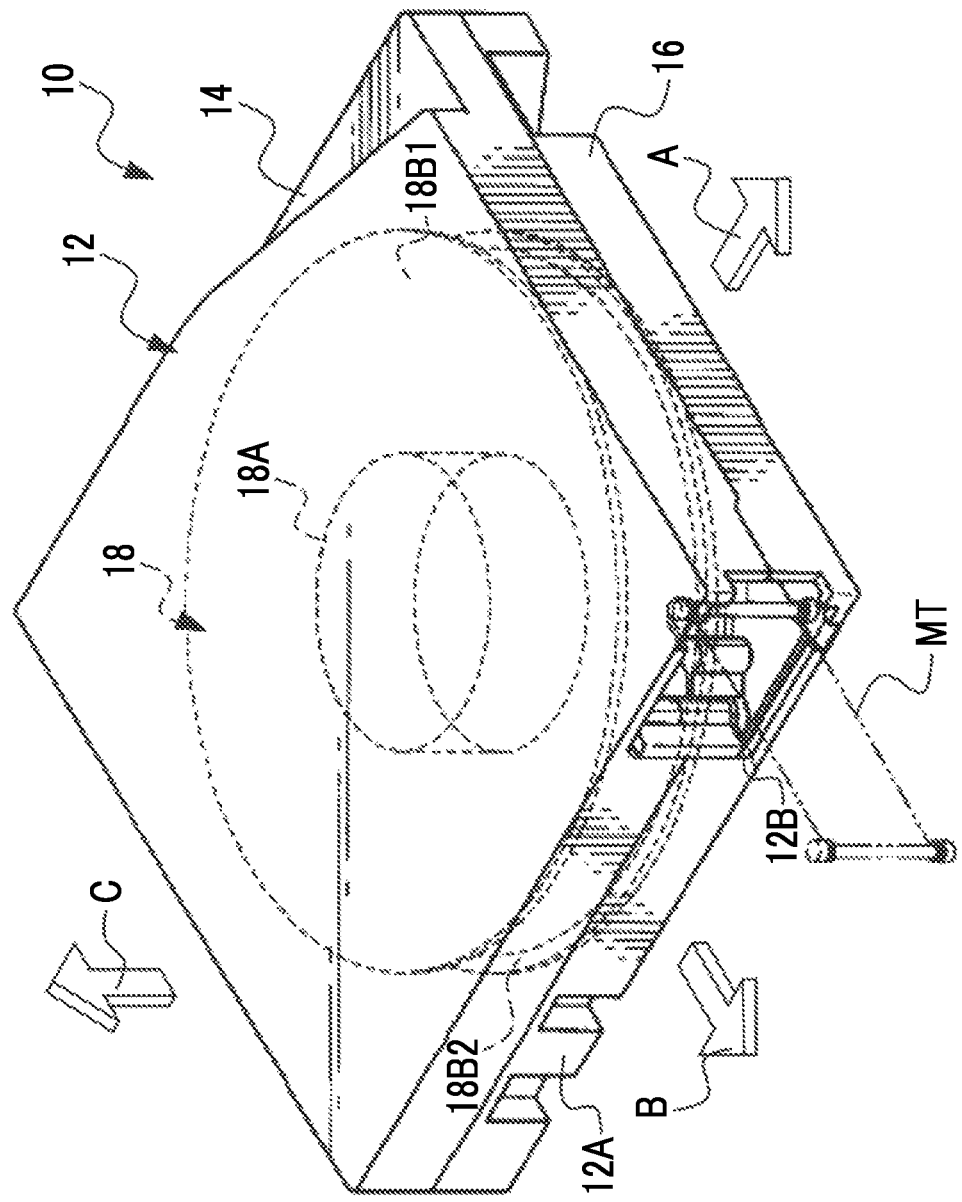
FIG. 1 is a schematic perspective view showing an example of the appearance of a magnetic tape cartridge.

Hereinafter, an example of an embodiment of a noncontact communication medium, a magnetic tape cartridge, a method for operating a noncontact communication medium, and a program according to the technique of the present disclosure will be described referring to the accompanying drawings.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". CM is an abbreviation for "Cartridge Memory". IBM is an abbreviation for "International Business Machines Corporation".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description of the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description of the structure, "lower" indicates the lower side of the magnetic tape cartridge 10.

In the following description, although LTO will be described as an example as the standard of the magnetic tape cartridge 10, this is merely an example, and other standards, such as IBM3592, may be employed.

As shown in FIG. 1 as an example, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B1 and the lower flange 18B2.

An opening 12B is formed on a front side of a right wall 12A of the case 12. The magnetic tape MT is pulled out from the opening 12B.

Figure 2:
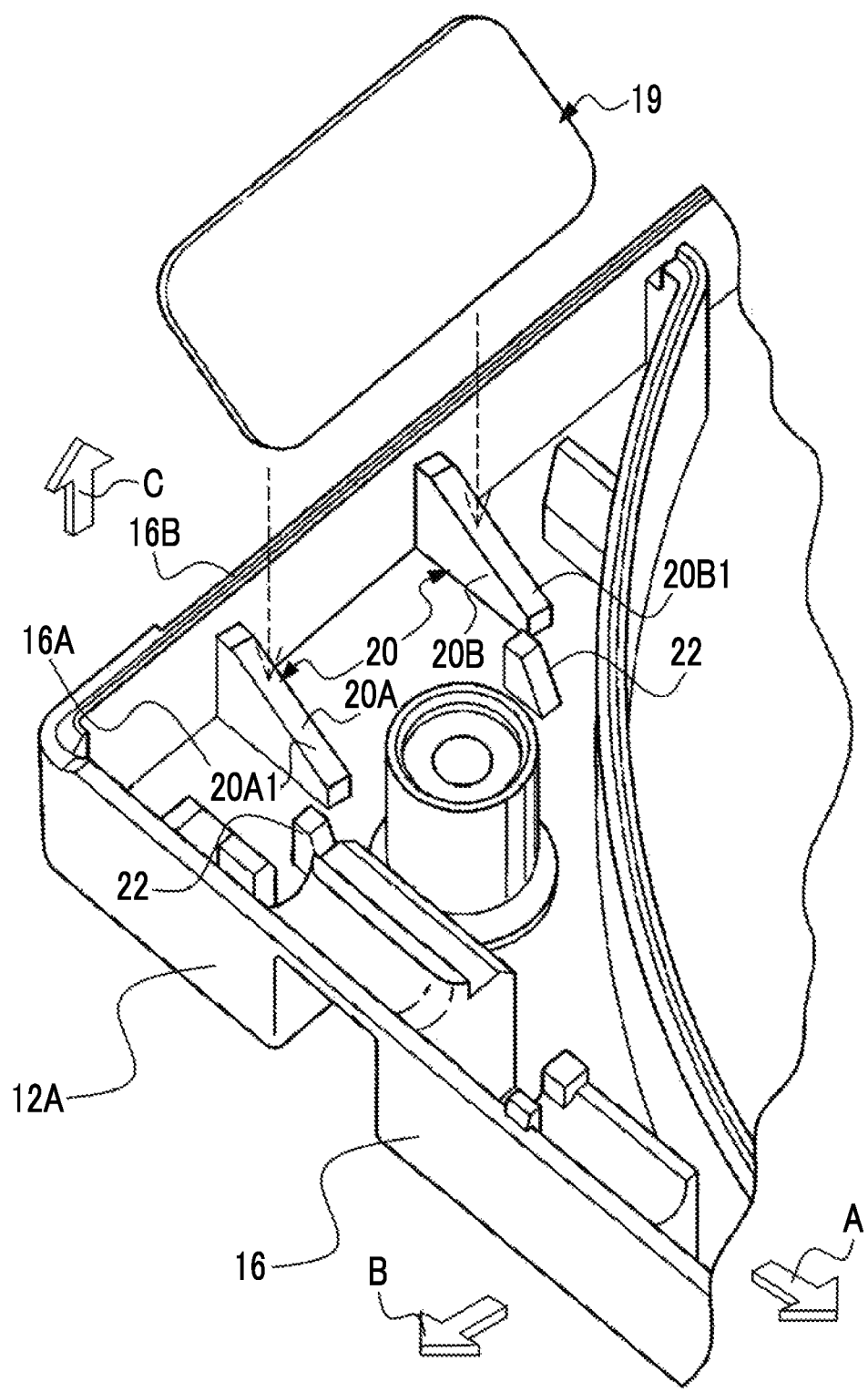
FIG. 2 is a schematic perspective view showing an example of the structure of a rear right end portion inside a lower case of the magnetic tape cartridge.

As shown in FIG. 2 as an example, a cartridge memory 19 is housed in a rear right end portion of the lower case 16. The cartridge memory 19 is an example of a "noncontact communication medium" according to the technique of the present disclosure. In the present embodiment, a so-called passive type RFID tag is employed as the cartridge memory 19.

Information (not shown) regarding the magnetic tape MT is stored in the cartridge memory 19. Information regarding the magnetic tape MT indicates, for example, management information (not shown) for managing the magnetic tape cartridge 10. The management information includes, for example, information regarding the cartridge memory 19, information capable of specifying the magnetic tape cartridge 10, and information indicating a recording capacity of the magnetic tape MT, the outline of information (hereinafter, referred to as "recorded information") recorded on the magnetic tape MT, items of the recorded information, and a recording format of the recorded information.

The cartridge memory 19 performs noncontact communication with an external communication device (not shown). Examples of the external communication device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external communication device performs reading and writing of various kinds of information with respect to the cartridge memory 19 in a noncontact manner. Though details will be described below, the cartridge memory 19 generates power with electromagnetic application to a magnetic field MF (see FIG. 5) from the external communication device. Then, the cartridge memory 19 operates using the generated power and performs transfer of various kinds of information with the external communication device by performing communication with the external communication device through the magnetic field.

As shown in FIG. 2 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. The second inclined mount 20B has an inclined surface 20B1, and the inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
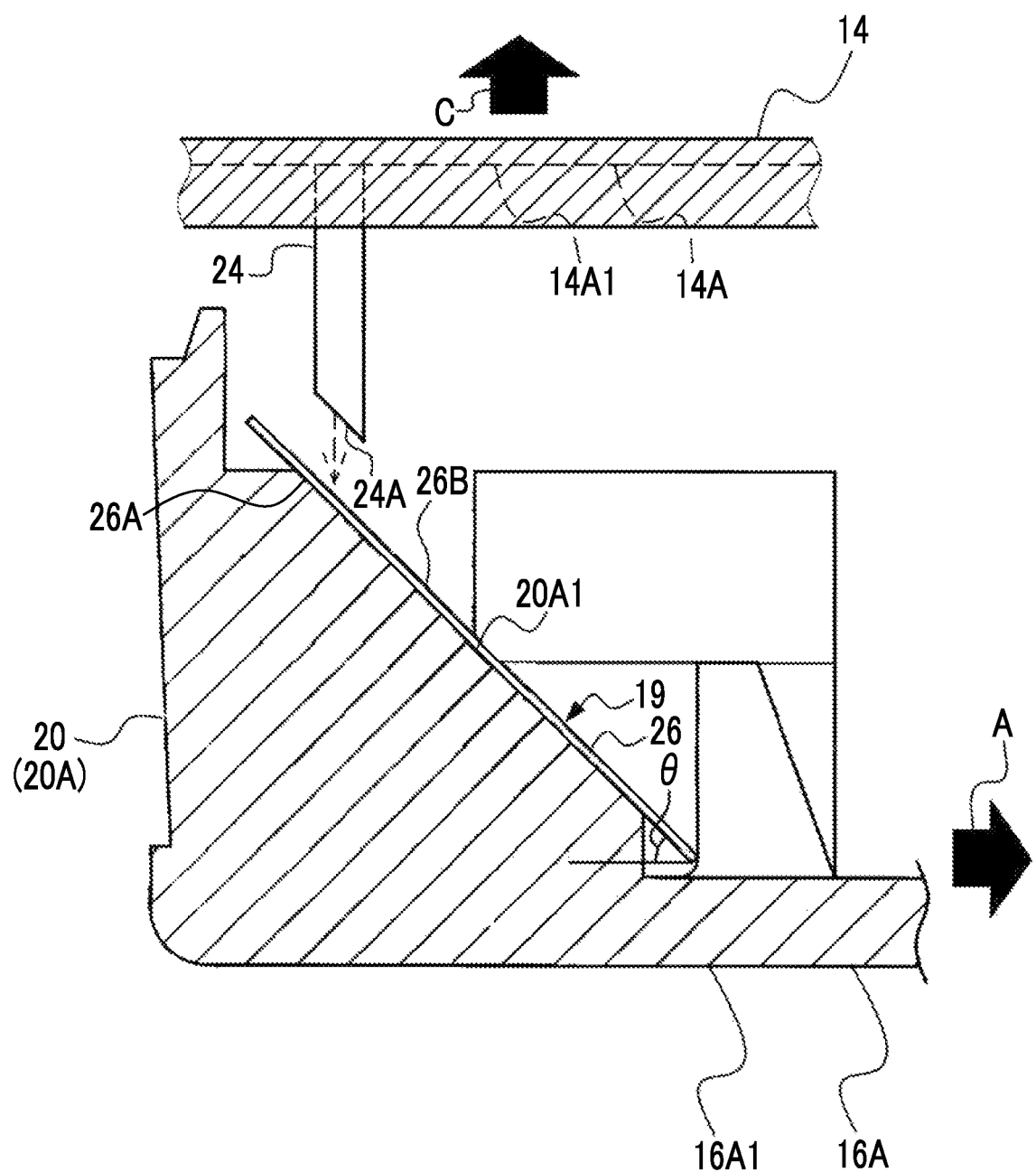
FIG. 3 is a side cross-sectional view showing an example of a support member provided on an inner surface of the lower case of the magnetic tape cartridge.

As shown in FIG. 3 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. Here, "parallel" indicates parallel in a meaning including an error that is generally allowed in the technical field to which the technique of the present disclosure belongs, and an error to such an extent not contrary to the spirit and scope of the technique of that the present disclosure, in addition to completely parallel. An inclination angle θ of the support member 20, that is, an inclination angle of each of the inclined surface 20A1 and the inclined surface 20B1 (see FIG. 2) is 45 degrees with respect to the reference surface 16A1. The inclination angle of 45 degrees is merely an example, and may be in a range of "0 degrees<inclination angle θ<45 degrees".

The cartridge memory 19 comprises a substrate 26. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B1 (see FIG. 2), and a front surface 26B of the substrate 26 is exposed to an inner surface 14A1 side of a top plate 14A of the upper case 14.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1 (see FIG. 2). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 2) of the support member 20. With this, a position in an up-down direction of the cartridge memory 19 is restricted by the ribs 24.

Figure 4:
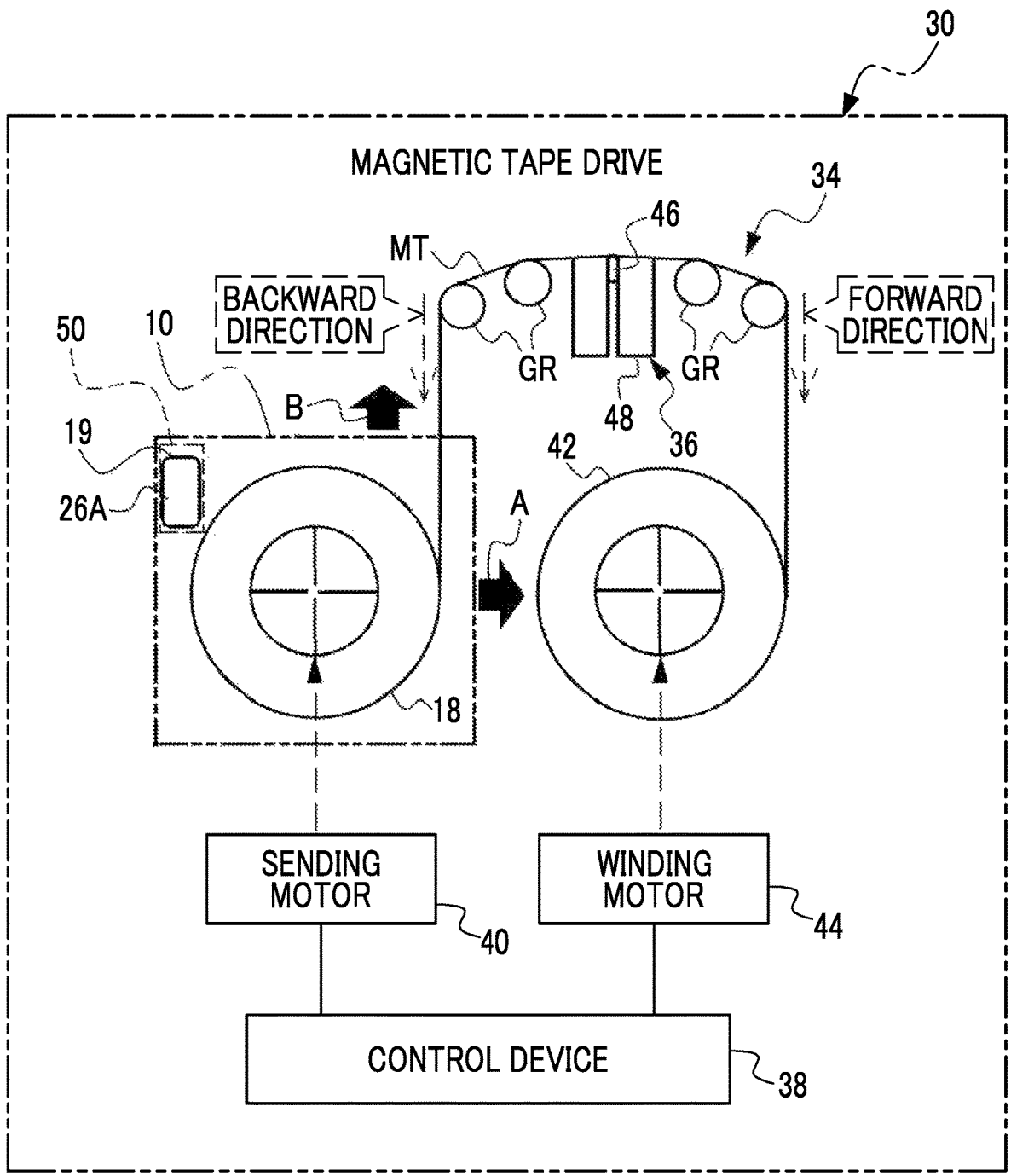
FIG. 4 is a schematic configuration diagram showing an example of the hardware configuration of a magnetic tape drive.

As shown in FIG. 4 as an example, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear scanning method. In the present embodiment, in other words, reading of the recorded information indicates reproduction of the recorded information. Here, although reading of the recorded information by the reading head 36 has been illustrated, the technique of the present disclosure is not limited thereto, and data may be written in the magnetic tape MT by a write-in head, data may be written in the magnetic tape MT or data may be read from the magnetic tape MT by a magnetic head.

The control device 38 controls the operation of the entire magnetic tape drive 30. In the present embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotates the cartridge reel 18 in the magnetic tape cartridge 10 under the control of the control device 38. The control device 38 controls the sending motor 40 to control a rotation direction, a rotation speed, rotation torque, and the like of the cartridge reel 18.

In a case where the magnetic tape MT is wound around the winding reel 42, the control device 38 rotates the sending motor 40 such that the magnetic tape MT runs in the forward direction. A rotation speed, rotation torque, and the like of the sending motor 40 are adjusted according to a speed of the magnetic tape MT wound around the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the control device 38 rotates the winding motor 44 such that the magnetic tape MT runs in the backward direction. A rotation speed, rotation torque, and the like of the winding motor 44 are adjusted according to the speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from a computer simulation and/or a test with a real machine as a range of tension in which data can be read from the magnetic tape MT by the reading head 36.

In a case of rewinding the magnetic tape MT to the cartridge reel 18, the control device 38 rotates the sending motor 40 and the winding motor 44 such that the magnetic tape MT runs in the backward direction.

In the present embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 to come into contact with the magnetic tape MT during running, and reads recorded information from the magnetic tape MT transported by the transport device 34.

The magnetic tape drive 30 comprises the noncontact reading and writing device 50. The noncontact reading and writing device 50 is disposed to confront the back surface 26A of the cartridge memory 19 below the magnetic tape cartridge 10 in a state in which the magnetic tape cartridge 30 is loaded. The state in which the magnetic tape cartridge 10 is loaded into the magnetic tape drive 30 indicates, for example, a state in which the magnetic tape cartridge 10 reaches a position determined in advance as a position where the magnetic tape cartridge 10 starts to read the recorded information with respect to the magnetic tape MT by the reading head 36.

In the example shown in FIG. 4, although an aspect example where the noncontact reading and writing device 50 is mounted on the magnetic tape drive 30 has been shown, the technique of the present disclosure is not limited thereto. The noncontact reading and writing device 50 is also used in a stage where the magnetic tape cartridge 10 is manufactured, a stage where the magnetic tape cartridge 10 is inspected, or a stage where the magnetic tape cartridge 10 is shipped. In this case, for example, a stationary or portable noncontact reading and writing device 50 is used. The noncontact reading and writing device 50 is an example of an "external communication device" according to the technique of the present disclosure.

Figure 5:
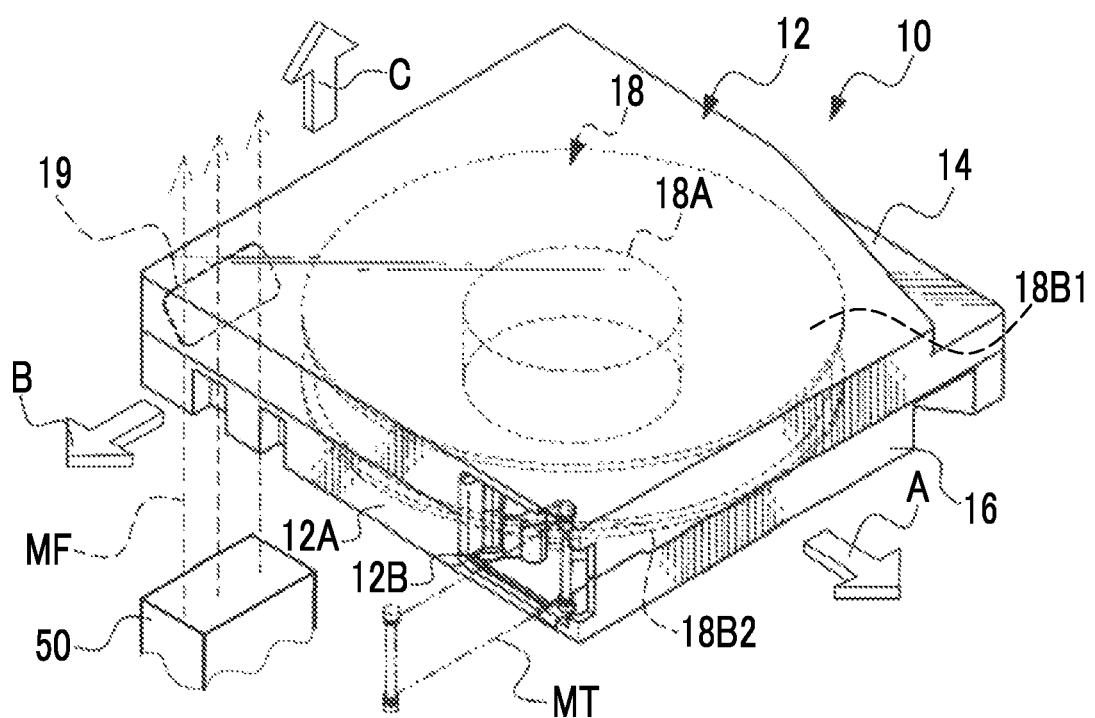
FIG. 5 is a schematic perspective view showing an example of an aspect in which a magnetic field is discharged from a lower side of the magnetic tape cartridge by a noncontact reading and writing device.

As shown in FIG. 5 as an example, the noncontact reading and writing device 50 emits a magnetic field MF from below the magnetic tape cartridge 10 toward the cartridge memory 19. The magnetic field MF passes through the cartridge memory 19.

Figure 6:
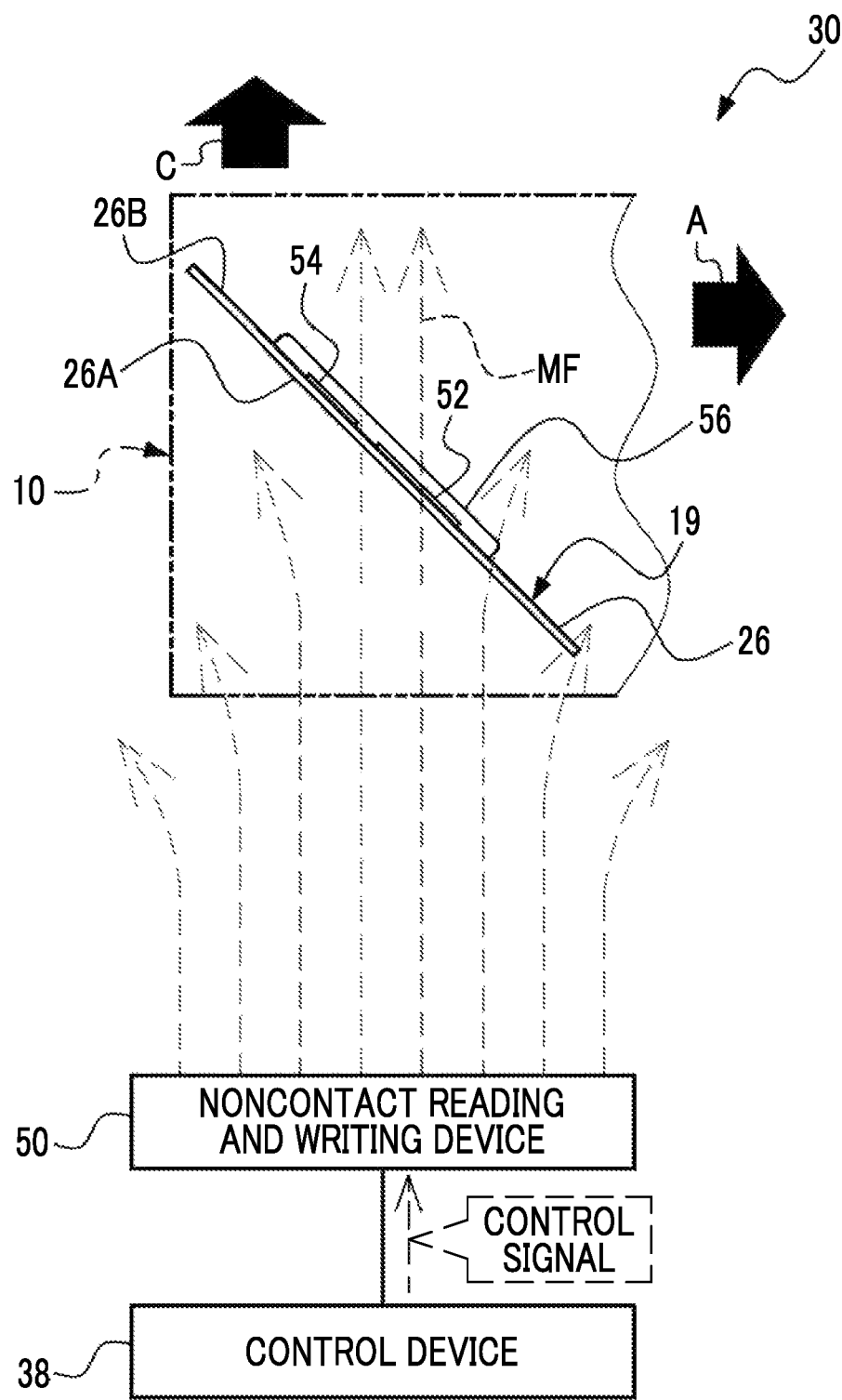
FIG. 6 is a conceptual diagram showing an example of an aspect in which a magnetic field is applied from the noncontact reading and writing device to a cartridge memory in the magnetic tape cartridge.

As shown in FIG. 6 as an example, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in response to the control signal input from the control device 38. The magnetic field MF passes through the cartridge memory 19 from the back surface 26A side to the front surface 26B side.

The noncontact reading and writing device 50 performs noncontact communication with the cartridge memory 19 to give a command signal depending on the control signal to the cartridge memory 19. In more detail, the noncontact reading and writing device 50 spatially transmits a command signal to the cartridge memory 19 under the control of the control device 38. Though described below in detail, the command signal is a signal indicating a command to the cartridge memory 19.

Here, although a form example where the noncontact reading and writing device 50 spatially transmits the command signal to the cartridge memory 19 under the control of the control device 38 has been described as an example, the technique of the present disclosure is not limited thereto. For example, in a stage where the magnetic tape cartridge 10 is manufactured, a stage where the magnetic tape cartridge 10 is inspected, or a stage where the magnetic tape cartridge 10 is shipped, the noncontact reading and writing device 50 spatially transmits the command signal to the cartridge memory 19 under the control of a control device different from the control device 38.

In a case where the command signal is spatially transmitted from the noncontact reading and writing device 50 to the cartridge memory 19, the command signal depending on an instruction from the control device 38 is included in the magnetic field MF by the noncontact reading and writing device 50. In other words, the command signal is superimposed on the magnetic field MF by the noncontact reading and writing device 50. That is, the noncontact reading and writing device 50 transmits the command signal to the cartridge memory 19 through the magnetic field MF under the control of the control device 38.

An IC chip 52 and a capacitor 54 are mounted on the front surface 26B of the cartridge memory 19. The IC chip 52 and the capacitor 54 are bonded to the front surface 26B. The IC chip 52 and the capacitor 54 are sealed with a sealing material 56 on the front surface 26B of the cartridge memory 19. Here, as the sealing material 56, ultraviolet curable resin that is cured upon reaction with ultraviolet rays is employed. The ultraviolet curable resin is merely an example, and photocurable resin that is cured upon reaction with light in a wavelength range other than ultraviolet rays may be used as the sealing material 56, thermosetting resin may be used as the sealing material 56, or other adhesives may be used as the sealing material 56.

Figure 7:
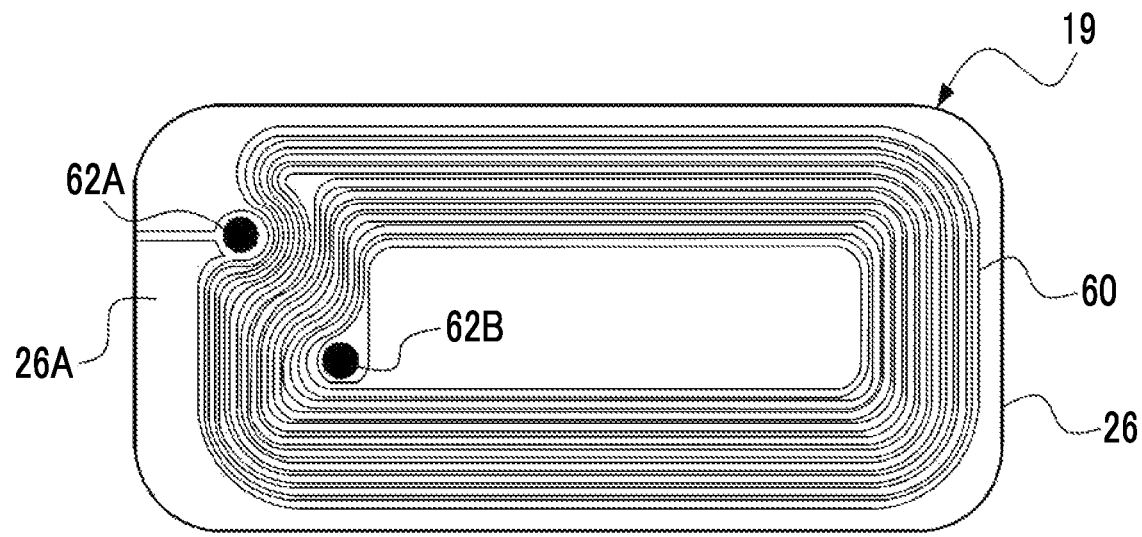
FIG. 7 is a schematic bottom view showing an example of the structure of a back surface of a substrate of the cartridge memory in the magnetic tape cartridge.

As an example, as shown in FIG. 7, a coil 60 is formed in a loop shape on the back surface 26A of the cartridge memory 19. Here, as a material of the coil 60, copper foil is employed. The copper foil is merely an example, and for example, other kinds of conductive materials, such as aluminum foil, may be used. The coil 60 induces an induced current with application of the magnetic field MF (see FIGS. 5 and 6) from the noncontact reading and writing device 50.

A first conduction portion 62A and a second conduction portion 62B are provided on the back surface 26A of the cartridge memory 19. The first conduction portion 62A and the second conduction portion 62B have solders and electrically connect both end portions of the coil 60 to the IC chip 52 (see FIGS. 6 and 8) and the capacitor 54 (see FIGS. 6 and 8) on the front surface 26B.

Figure 8:
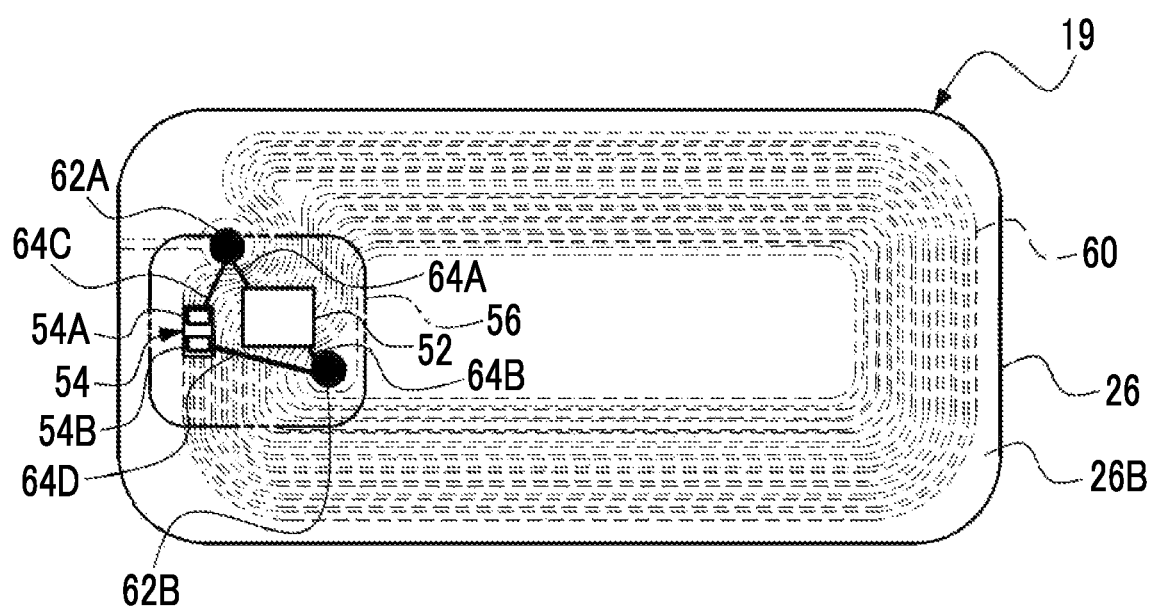
FIG. 8 is a schematic plan view showing an example of the structure of a front surface of the substrate of the cartridge memory in the magnetic tape cartridge.

As an example, as shown in FIG. 8, on the front surface 26B of the cartridge memory 19, the IC chip 52 and the capacitor 54 are electrically connected to each other using a wired connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 8, a pair of electrodes is electrodes 54A and 54B. The electrode 54A is connected to the first conduction portion 62A through a wiring 64C, and the electrode 54B is connected to the second conduction portion 62B through a wiring 64D. With this, the IC chip 52 and the capacitor 54 are connected in parallel with the coil 60.

Figure 9:
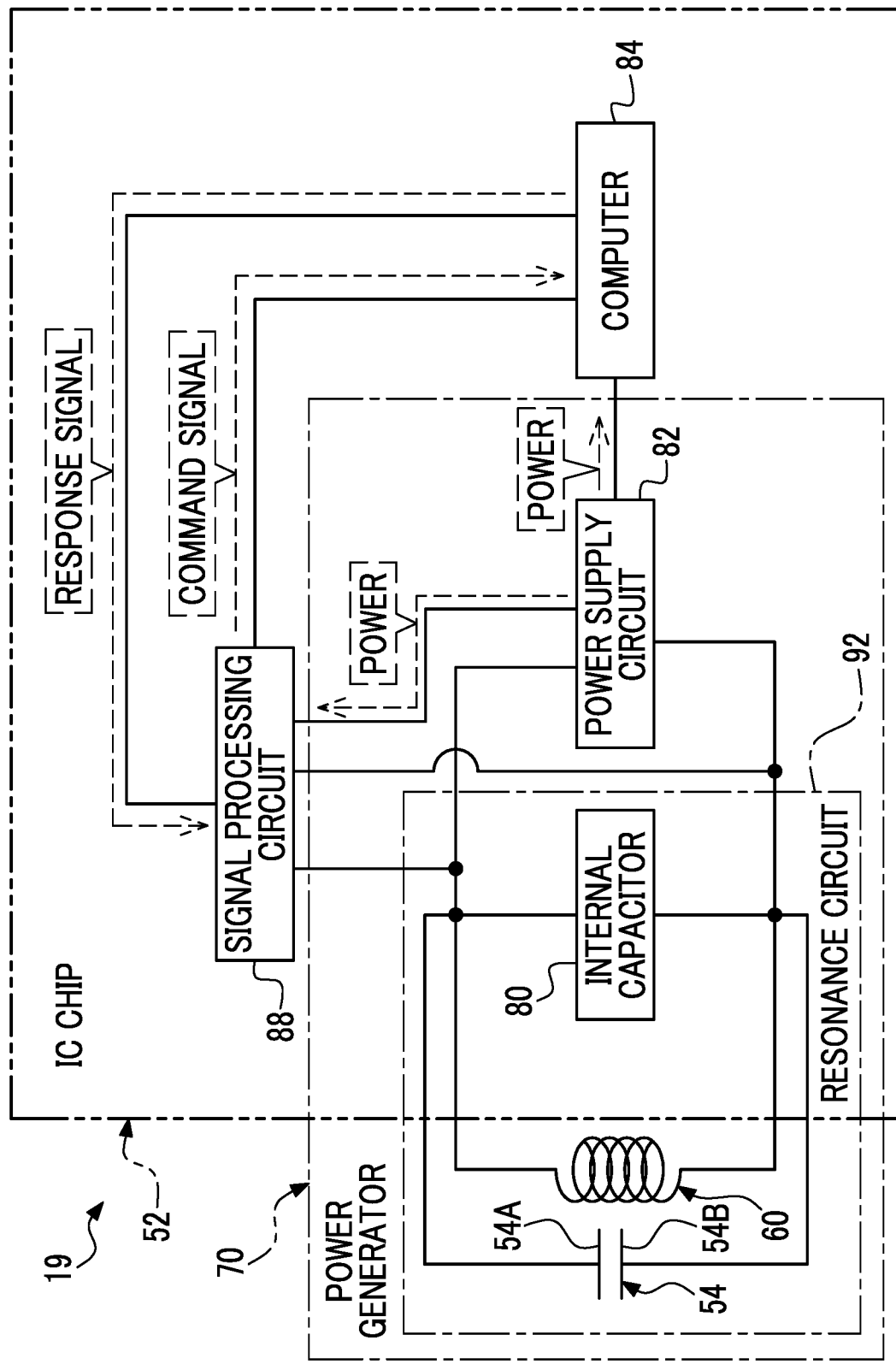
FIG. 9 is a schematic circuit diagram showing an example of the circuit configuration of the cartridge memory in the magnetic tape cartridge.

As shown in FIG. 9 as an example, the IC chip 52 comprises an internal capacitor 80, a power supply circuit 82, a computer 84, a clock signal generator 86, and a signal processing circuit 88. The IC chip 52 is a general-purpose IC chip that is also usable for purposes other than the magnetic tape cartridge 10.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power.

The power generator 70 has the resonance circuit 92 and the power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 is not enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is the same frequency as the frequency of the magnetic field MF, and here, 13.56 MHz is employed. The capacitance of the capacitor 54 is determined based on a measured value of the capacitance of the internal capacitor 80.

The resonance circuit 92 generates an alternating-current power by generating a resonance phenomenon at the resonance frequency determined in advance using the induced current induced by the coil 60 with the magnetic field MF passing through the coil 60 and outputs the generated alternating-current power to the power supply circuit 82.

The power supply circuit 82 has a rectifier circuit, a smoothing circuit, and the like. The rectifier circuit is a full-wave rectifier circuit having a plurality of diodes. The full-wave rectifier circuit is merely an example, and a half-wave rectifier circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. Examples of various drive elements include the computer 84, the clock signal generator 86, and the signal processing circuit 88. In this way, power is supplied to various drive elements in the IC chip 52 by the power generator 70, whereby the IC chip 52 operates using power generated by the power generator 70.

The computer 84 is an example of a "computer that is applied to a noncontact communication medium" according to the technique of the present disclosure, and controls the entire cartridge memory 19.

The clock signal generator 86 generates a clock signal and outputs the clock signal to various drive elements. Various drive elements operate in response to the clock signal input from the clock signal generator 86. The clock signal generator 86 changes a frequency of the clock signal in response to an instruction of the computer 84.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes a command signal from the magnetic field MF received by the coil 60 and outputs the command signal to the computer 84. The computer 84 outputs a response signal to the command signal to the signal processing circuit 88. That is, the computer 84 executes processing according to the command signal input from the signal processing circuit 88 and outputs a processing result as a response signal to the signal processing circuit 88. In the signal processing circuit 88, in a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 through the magnetic field MF.

Figure 10:
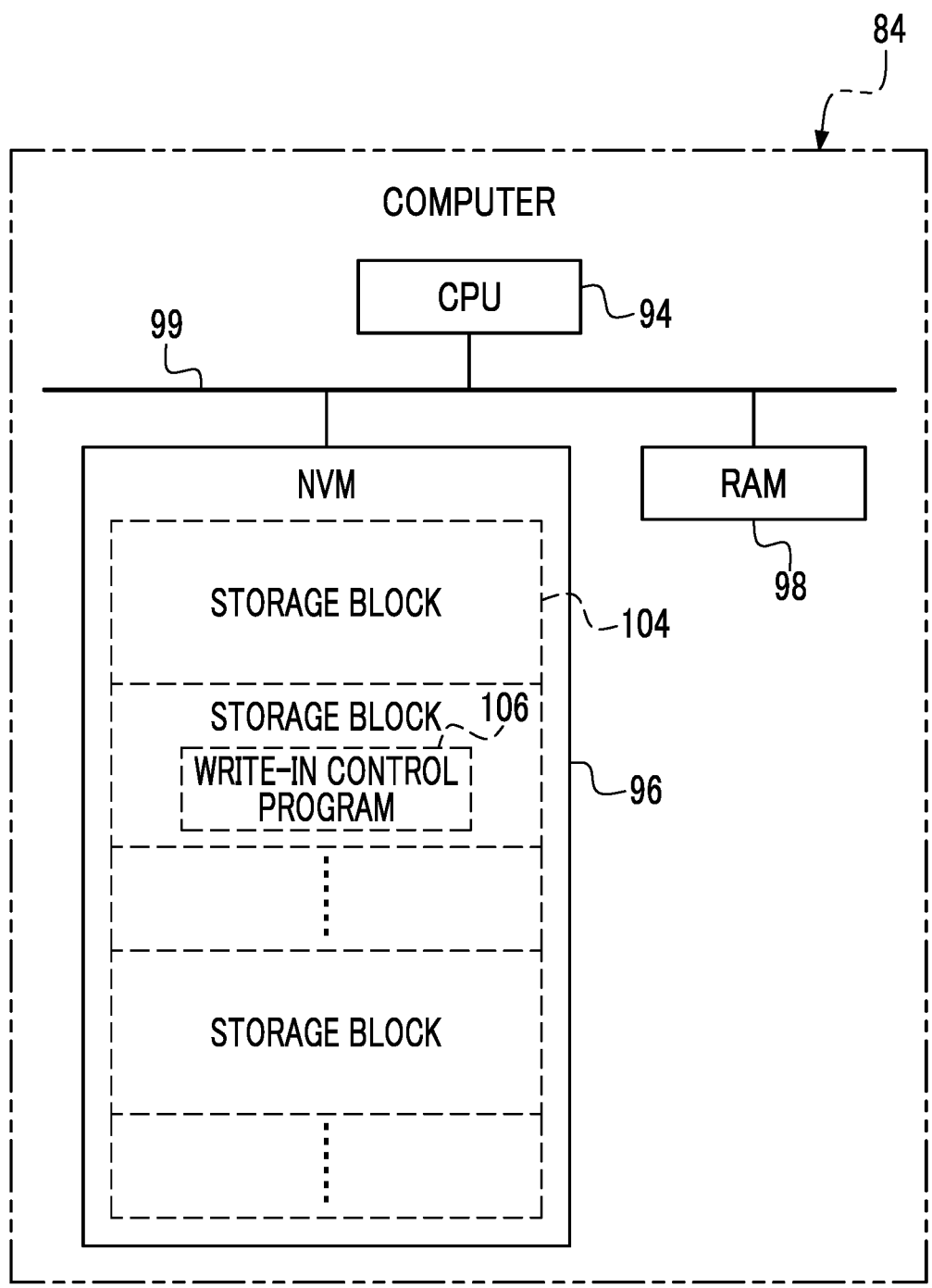
FIG. 10 is a block diagram showing an example of the hardware configuration of a computer of an IC chip mounted on the cartridge memory in the magnetic tape cartridge.

As an example, as shown in FIG. 10, the computer 84 comprises a CPU 94, an NVM 96, and a RAM 98. The CPU 94, the NVM 96, and the RAM 98 are connected to a bus 99.

The CPU 94 is an example of a "processor" according to the technique of the present disclosure. The CPU 94 controls the entire cartridge memory 19. The NVM 96 is an example of a "memory" according to the technique of the present disclosure. An example of the NVM 96 is an EEPROM. The EEPROM is merely an example, and for example, a ferroelectric memory may be used instead of the EEPROM or any memory may be used as long as the memory is a non-volatile memory that can be mounted on the IC chip 52. The NVM 96 has a plurality of storage blocks 104. Management information (not shown) and the like are stored in the plurality of storage blocks 104.

The CPU 94 selectively executes polling processing, readout processing, write-in processing, and locking processing depending on the command signal input from the signal processing circuit 88. The polling processing is processing of establishing communication with the noncontact reading and writing device 50, and is executed, for example, as preparation processing in a pre-stage of the readout processing and the write-in processing. The readout processing is processing of reading out the management information and the like from the NVM 96. The write-in processing is processing of writing the management information and the like in the NVM 96. The locking processing is processing of locking a CM attribute information storage block 104A (see FIG. 11) that is one of the plurality of storage blocks 104, in other words, processing of disabling rewriting of information stored in the CM attribute information storage block 104A. Here, a meaning of "rewriting of information" also includes a meaning of "erasure of information".

In the present embodiment, the management information and the like are not stored in the plurality of storage blocks 104 of the NVM 96 in the cartridge memory 19 that is provided to a vendor of the magnetic tape cartridge 10, that is, the cartridge memory 19 that is charged in a manufacturing process of the magnetic tape cartridge 10. For this reason, the vendor of the magnetic tape cartridge 10 causes the CPU 94 to execute write-in processing in the manufacturing process of the magnetic tape cartridge 10, whereby the management information and the like are written in the plurality of storage blocks 104.

A write-in control program 106 is stored in one of the plurality of storage blocks 104. The CPU 94 reads out the write-in control program 106 from one of the plurality of storage blocks 104 and executes the write-in control program 106 on the RAM 98. Write-in control processing (see FIG. 19) described below is realized with execution of the write-in control program 106 by the CPU 94.

Figure 11:
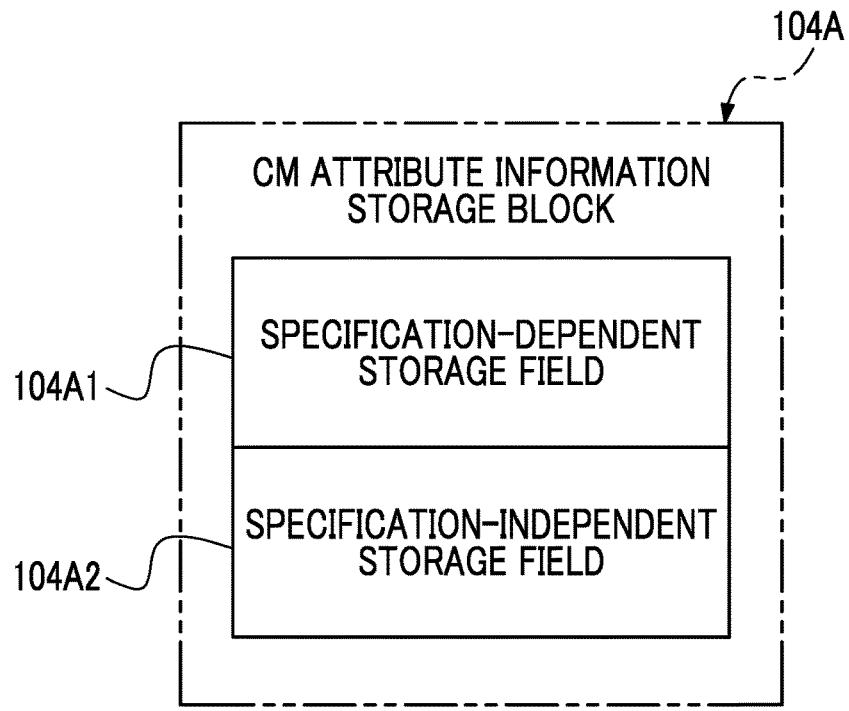
FIG. 11 is a block diagram showing an example of the schematic configuration of a CM attribute information storage block.

One (for example, the storage block 104 including a head address among the plurality of storage blocks 104) of the plurality of storage blocks 104 is the CM attribute information storage block 104A as shown in FIG. 11 as an example. The CM attribute information storage block 104A is an example of a "storage block" according to the technique of the present disclosure. That is, the CM attribute information storage block 104A is a storage block that stores information (hereinafter, referred to as "CM attribute information") indicating an attribute of the cartridge memory 19. The CM attribute information storage block 104A has a specification-dependent storage field 104A1 and a specification-independent storage field 104A2. Specification-dependent information is stored in the specification-dependent storage field 104A1. The specification-dependent information indicates information dependent on a specification of the magnetic tape cartridge 10, in which the cartridge memory 19 is mounted, in other words, information that is determined depending on the specification of the magnetic tape cartridge 10, in which the cartridge memory 19 is mounted.

The specification-dependent information is given from the noncontact reading and writing device 50 to the cartridge memory 19 by noncontact communication between the noncontact reading and writing device 50 and the cartridge memory 19. The specification-dependent information given from the noncontact reading and writing device 50 to the cartridge memory 19 is written in the specification-dependent storage field 104A1 by the CPU 94.

Specification-independent information is stored in the specification-independent storage field 104A2. The specification-independent information indicates information independent of the specification of the magnetic tape cartridge 10, in which the cartridge memory 19 is mounted, in other words, information other than information that is determined depending on the specification of the magnetic tape cartridge 10, in which the cartridge memory 19 is mounted.

The specification-independent information is given from the noncontact reading and writing device 50 to the cartridge memory 19 by noncontact communication between the noncontact reading and writing device 50 and the cartridge memory 19. The specification-independent information given from the noncontact reading and writing device 50 to the cartridge memory 19 is written in the specification-independent storage field 104A2 by the CPU 94.

Figure 12:
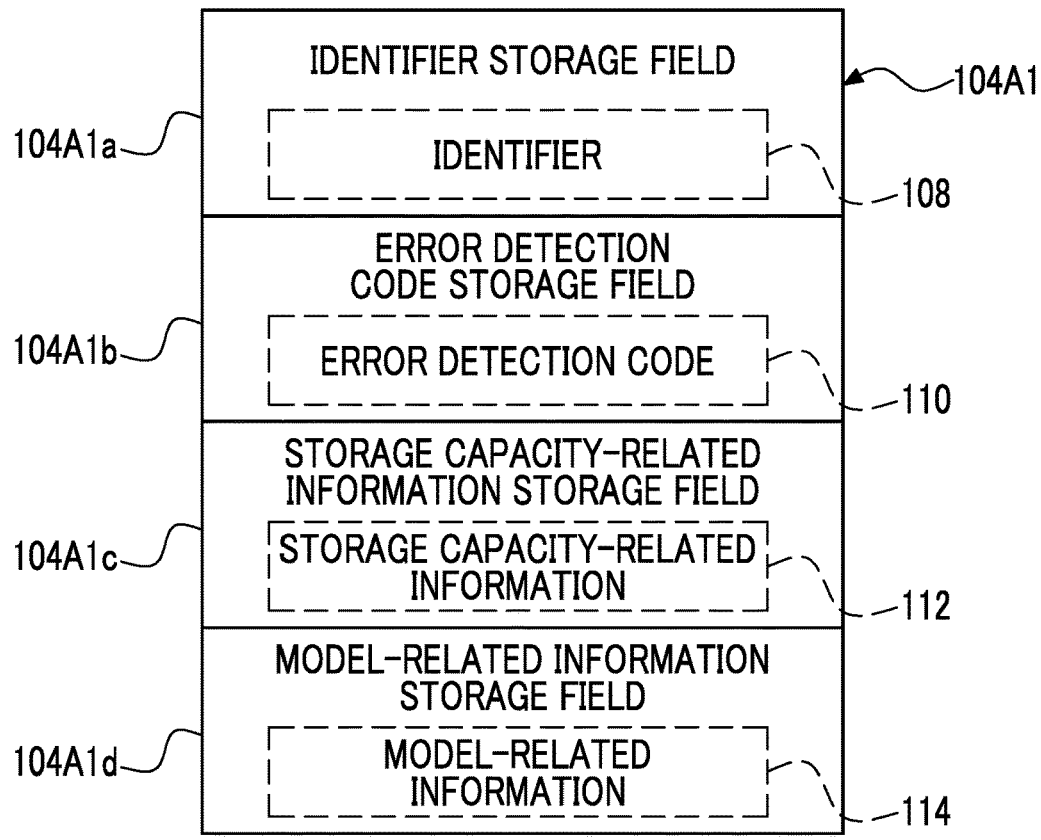
FIG. 12 is a block diagram showing an example of the schematic configuration of a specification-dependent storage field in the CM attribute information storage block.

As shown in FIG. 12 as an example, the specification-dependent storage field 104A1 has an identifier storage field 104A1a, an error detection code storage field 104A1b, a storage capacity-related information storage field 104A1c, and a model-related information storage field 104A1d.

An identifier 108 (for example, a serial number) capable of specifying the cartridge memory 19 is stored in the identifier storage field 104A1a. The identifier 108 is given from the noncontact reading and writing device 50 to the cartridge memory 19 by noncontact communication between the noncontact reading and writing device 50 (for example, the noncontact reading and writing device 50 that is used in the stage where the magnetic tape cartridge 10 is manufactured) and the cartridge memory 19. The identifier 108 given from the noncontact reading and writing device 50 to the cartridge memory 19 is written in the identifier storage field 104A1a by the CPU 94.

A code 110 (hereinafter, referred to as an "error detection code 110") for error detection for the identifier 108 is stored in the error detection code storage field 104A1b. An example of the error detection code 110 is a check sum. The CPU 94 calculates the error detection code 110 and writes the error detection code 110 in the error detection code storage field 104A1b in response to an instruction given from the noncontact reading and writing device 50 to the cartridge memory 19 by noncontact communication between the noncontact reading and writing device 50 (for example, the noncontact reading and writing device 50 that is used in the stage where the magnetic tape cartridge 10 is manufactured) and the cartridge memory 19.

Here, although an example where the error detection code 110 for the identifier 108 is calculated by the CPU 94 has been described, the technique of the present disclosure is not limited thereto, and an error detection code 110 for the CM attribute information may be calculated by the CPU 94. The identifier 108 or the CM attribute information is an example of "information including an identifier" according to the technique of the present disclosure.

An error detection code 110 for a part of information included in the CM attribute information may be calculated by the CPU 94. In this case, a part of information included in the CM attribute information is an example of "information including an identifier" according to the technique of the present disclosure. Examples of a part of information included in the CM attribute information include the identifier 108 and at least one kind of information between storage capacity-related information 112 that is information related to a storage capacity of the NVM 96 (for example, the storage capacity of the plurality of blocks 104) or model-related information 114 that is information related to a model of the cartridge memory 19.

Here, although the check sum is used as an example of the error detection code 110, the technique of the present disclosure is not limited thereto, and other codes for error detection, such as a parity bit or a humming code, may be used.

The storage capacity-related information 112 is stored in the storage capacity-related information storage field 104A1c. The storage capacity-related information 112 is given from the noncontact reading and writing device 50 to the cartridge memory 19 by noncontact communication between the noncontact reading and writing device 50 (for example, the noncontact reading and writing device 50 that is used in the stage where the magnetic tape cartridge 10 is manufactured) and the cartridge memory 19. The storage capacity-related information 112 given from the noncontact reading and writing device 50 to the cartridge memory 19 is written in the storage capacity-related information storage field 104A1c by the CPU 94.

The model-related information 114 is stored in the model-related information storage field 104A1d. The model-related information 114 is given from the noncontact reading and writing device 50 to the cartridge memory 19 by noncontact communication between the noncontact reading and writing device 50 (for example, the noncontact reading and writing device 50 that is used in the stage where the magnetic tape cartridge 10 is manufactured) and the cartridge memory 19. The model-related information 114 given from the noncontact reading and writing device 50 to the cartridge memory 19 is written in the model-related information storage field 104A1d by the CPU 94.

Figure 13:
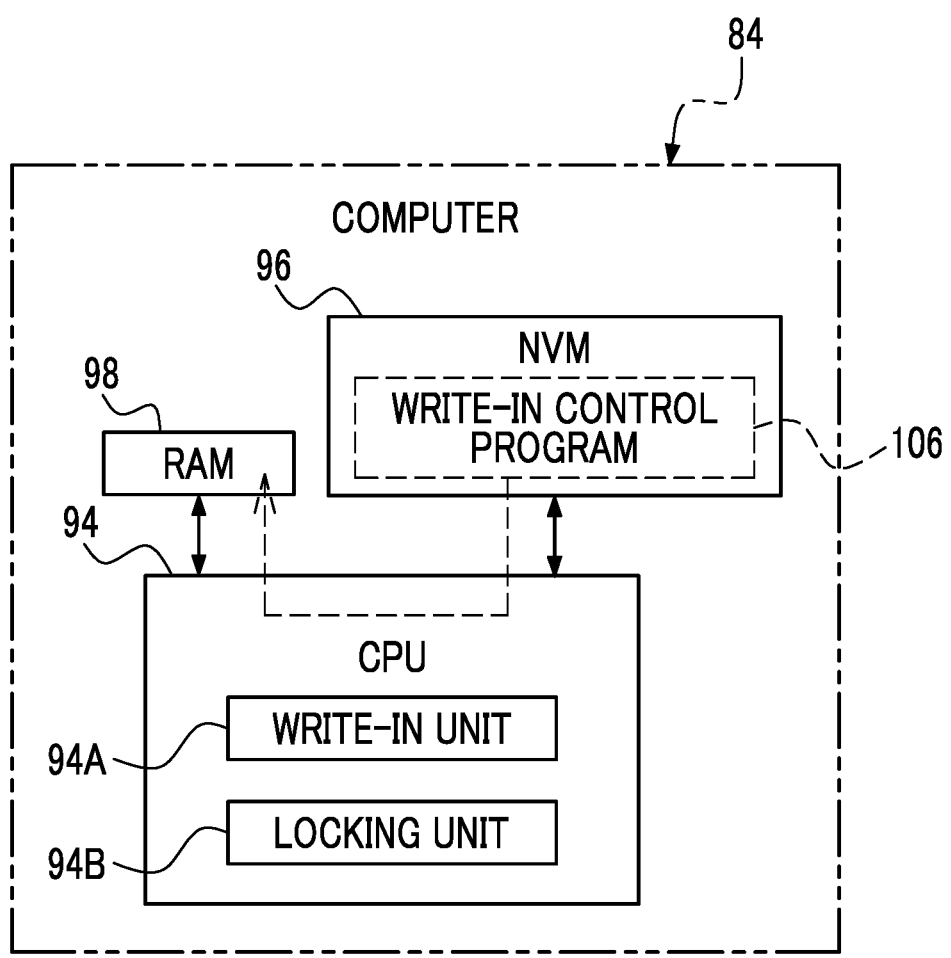
FIG. 13 is a block diagram showing an example of a main function of a CPU that is realized with execution of write-in control program by a CPU of the cartridge memory.

As shown in FIG. 13 as an example, the CPU 94 reads out the write-in control program 106 from the NVM 96 and executes the read-out write-in control program 106 on the RAM 98. The CPU 94 operates as a write-in unit 94A and a locking unit 94B following the write-in control program 106 that is executed on the RAM 98, thereby executing write-in control processing (see FIG. 19) described below.

By the way, the CPU 94 operates in response to the command signal input from the signal processing circuit 88. A command indicated by the command signal is a polling command, a readout command, a write-in command, a locking processing command, or the like. In a case where the command indicated by the command signal is the polling command, the CPU 94 executes the polling processing. In a case where the command indicated by the command signal is the readout command, the CPU 94 executes the readout processing. In a case where the command indicated by the command signal is the write-in command, the CPU 94 executes the write-in processing. In a case where the command indicated by the command signal is the locking processing command, the CPU 94 executes locking processing. The locking processing command is an example of a "specific command" according to the technique of the present disclosure.

Figure 14:
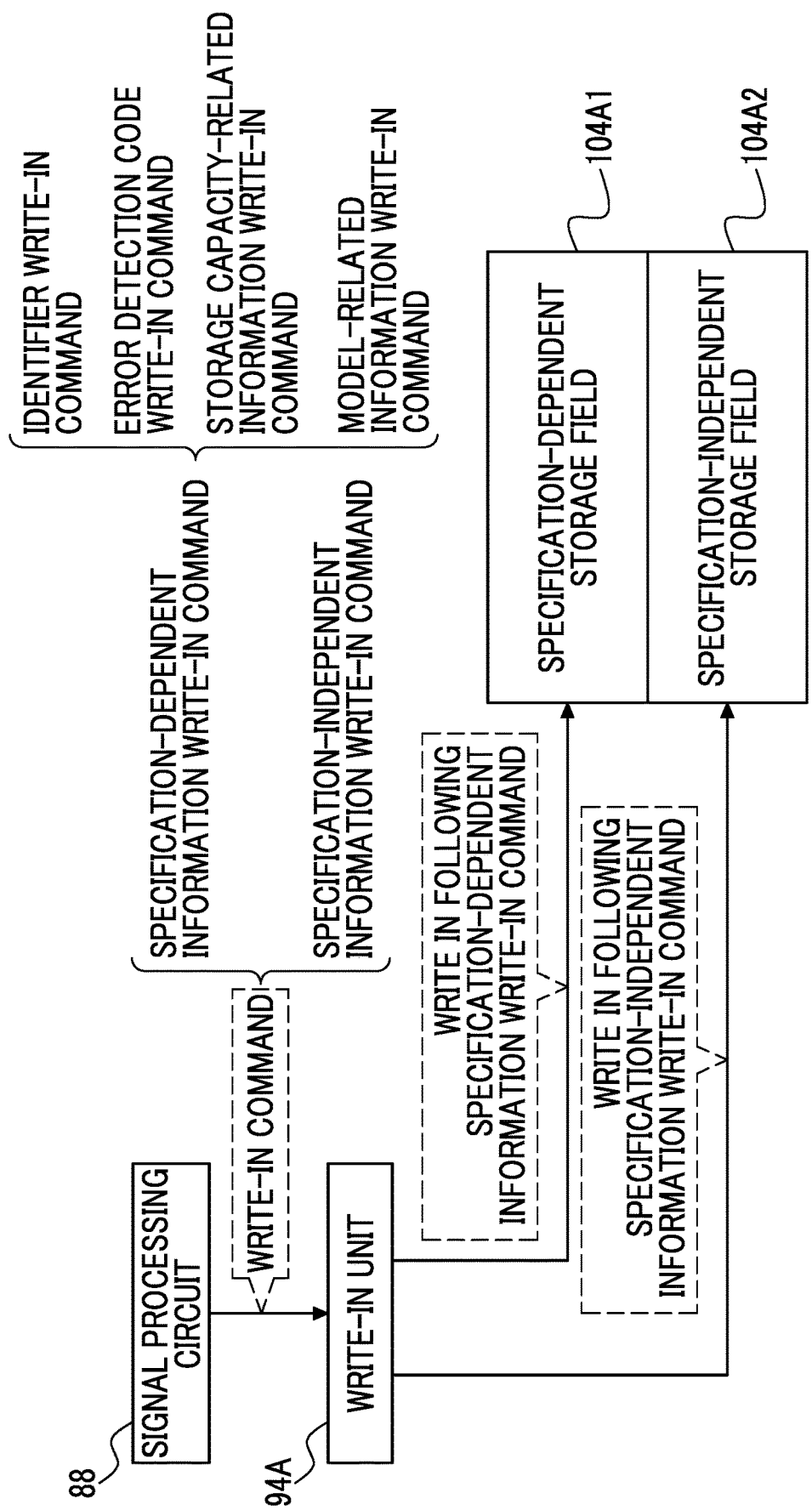
FIG. 14 is a block diagram showing an example of rough processing contents of a write-in unit.

There are a plurality of types of write-in commands. The write-in unit 94A executes write-in processing depending on a type of a write-in command indicated by the command signal input from the signal processing circuit 88. As shown in FIG. 14 as an example, examples of the plurality of types of write-in commands include a specification-dependent information write-in command and a specification-independent information write-in command.

In a case where the write-in command indicated by the command signal is the specification-dependent information write-in command, the write-in unit 94A performs write-in to the specification-dependent storage field 104A1 in response to the specification-dependent information write-in command. In a case where the write-in command indicated by the command signal is the specification-independent information write-in command, the write-in unit 94A performs write-in to the specification-independent storage field 104A2 in response to the specification-independent information write-in command.

The specification-dependent information write-in command is an identifier write-in command, an error detection code write-in command, a storage capacity-related information write-in command, and a model-related information write-in command.

Figure 15:
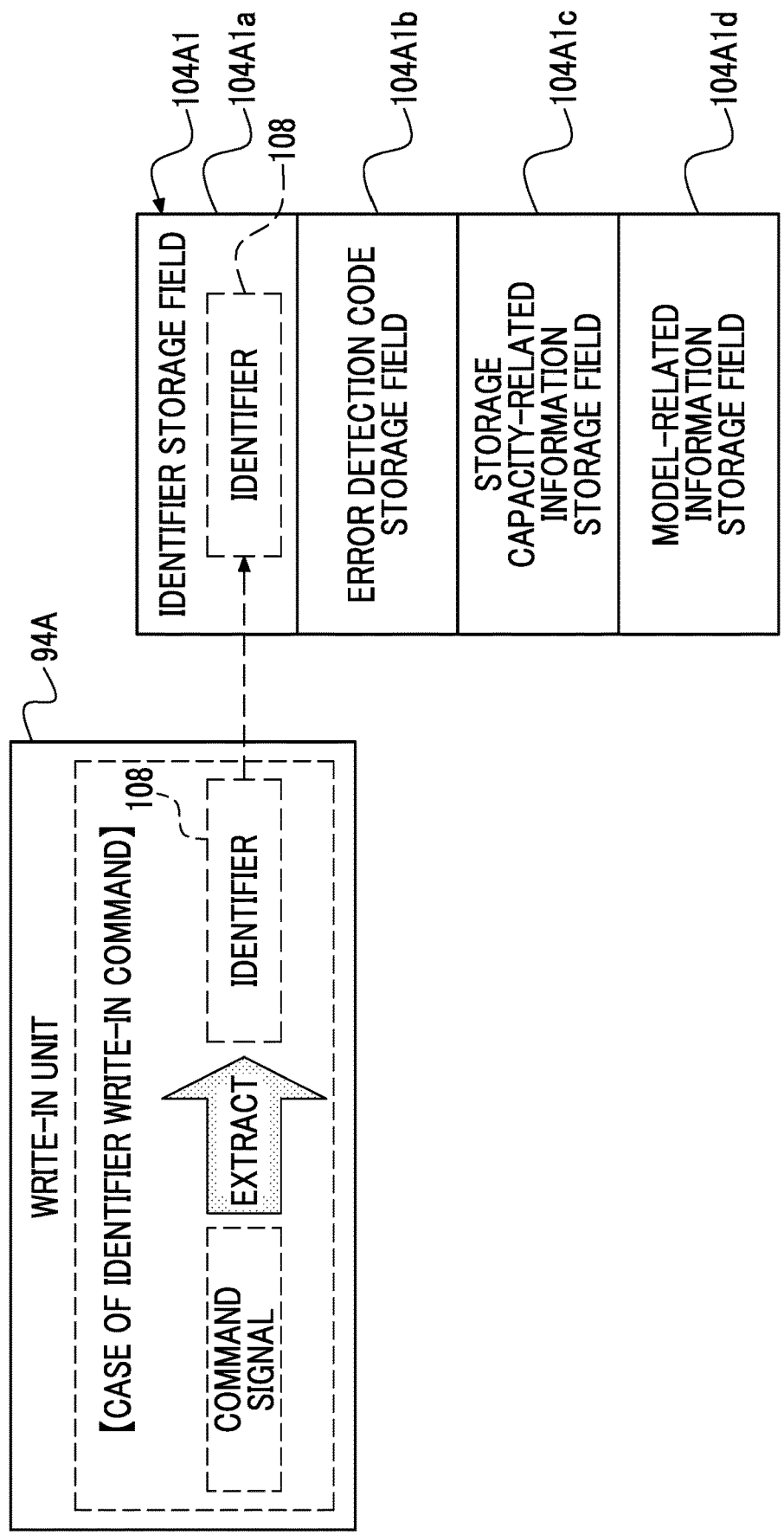
FIG. 15 is a block diagram showing an aspect in which an identifier is written in an identifier storage field by the write-in unit.

As shown in FIG. 15 as an example, in a case where the specification-dependent information write-in command that is indicated by the command signal input to the write-in unit 94A is the identifier write-in command, the identifier 108 is included in the command signal. In this case, the write-in unit 94A extracts the identifier 108 from the command signal and writes the extracted identifier 108 in the identifier storage field 104A1a.

In a case where the identifier 108 is stored in the identifier storage field 104A1a in a stage before the locking processing is executed, the write-in unit 94A changes the identifier 108 of the identifier storage field 104A1a in response to an instruction given from the noncontact reading and writing device 50 to the cartridge memory 19. In more detail, in a state in which the identifier 108 is stored in the identifier storage field 104A1a in the stage before the locking processing is executed, in a case where a new identifier 108 is given from the noncontact reading and writing device 50 to the cartridge memory 19 through the identifier write-in command, the write-in unit 94A changes the identifier 108 of the identifier storage field 104A1a to the new identifier 108 given from the noncontact reading and writing device 50.

Figure 16:
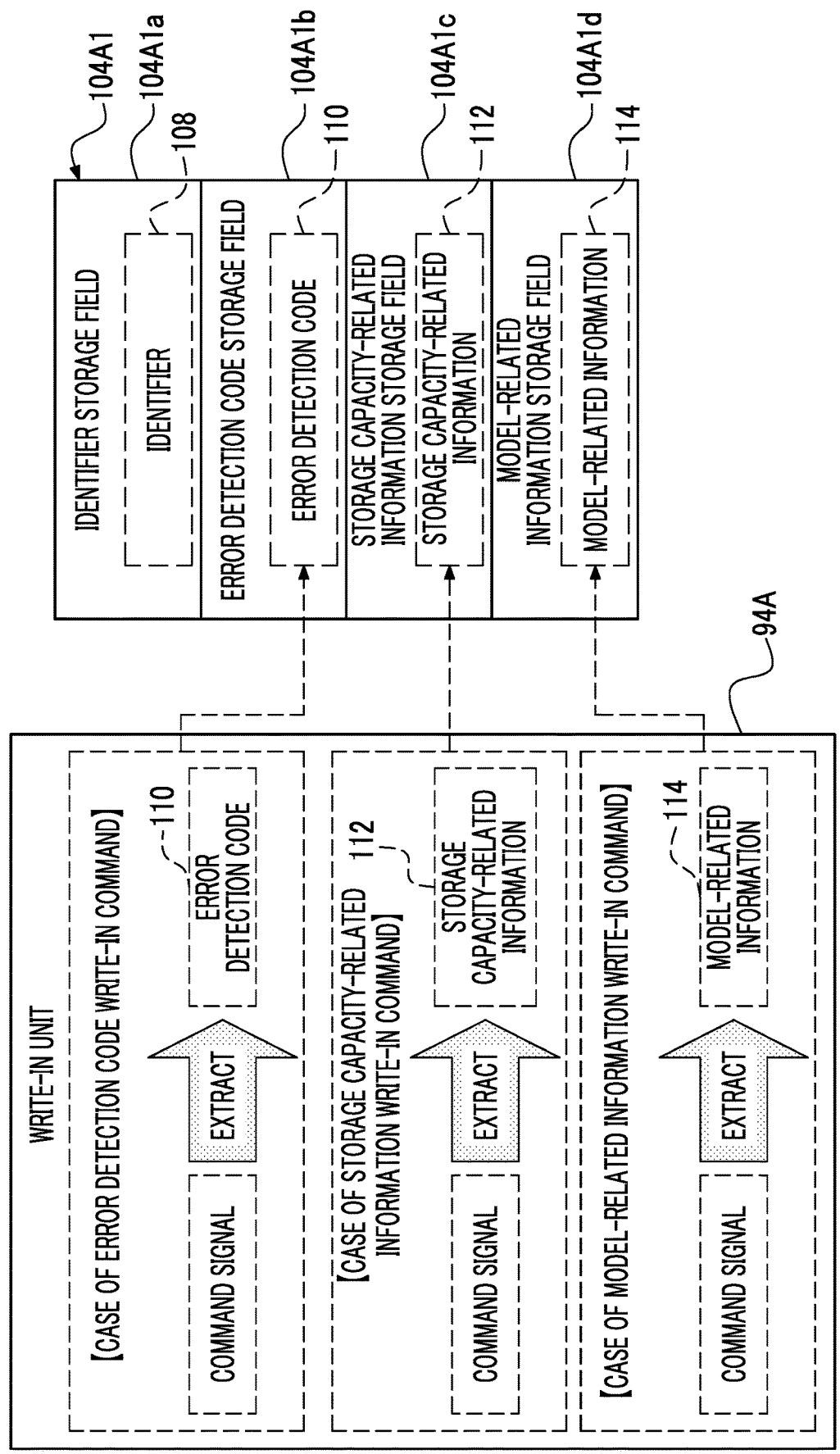
FIG. 16 is a block diagram showing an example of an aspect in which an error detection code is written in an error detection code storage field by the write-in unit, storage capacity-related information is written in a storage capacity-related information storage field by the write-in unit, and model-related information is written in a model-related information storage field by the write-in unit.

As shown in FIG. 16 as an example, in a case where the specification-dependent information write-in command that is indicated by the command signal input to the write-in unit 94A is the error detection code write-in command, the write-in unit 94A calculates the error detection code 110 for the identifier 108 and writes the calculated error detection code 110 in the error detection code storage field 104A1b. In a case where the specification-dependent information write-in command that is indicated by the command signal input to the write-in unit 94A is the storage capacity-related information write-in command, the storage capacity-related information 112 is included in the command signal. In this case, the write-in unit 94A extracts the storage capacity-related information 112 from the command signal and writes the extracted storage capacity-related information 112 in the storage capacity-related information storage field 104A1c. In a case where the specification-dependent information write-in command that is indicated by the command signal input to the write-in unit 94A is the model-related information write-in command, the model-related information 114 is included in the command signal. In this case, the write-in unit 94A extracts the model-related information 114 from the command signal and writes the extracted model-related information 114 in the model-related information storage field 104A1d.

Figure 17:
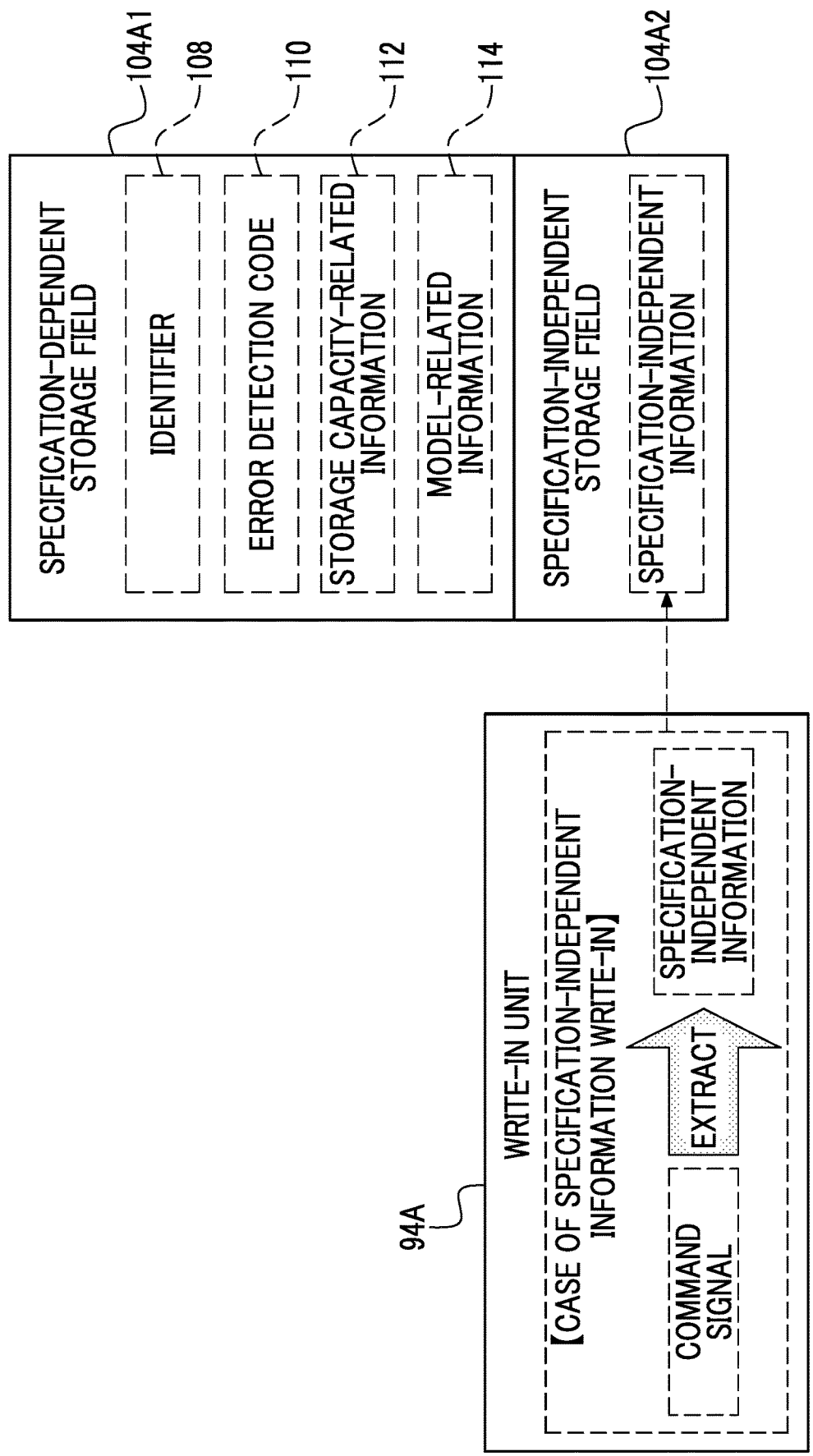
FIG. 17 is a block diagram showing an example of an aspect in which specification-independent information is written in a specification-independent storage field by the write-in unit.

As shown in FIG. 17 as an example, in a case where the write-in command that is indicated by the command signal input to the write-in unit 94A is the specification-independent information write-in command, the specification-independent information is included in the command signal. In this case, the write-in unit 94A extracts the specification-independent information from the command signal and writes the extracted specification-independent information in the specification-independent storage field 104A2.

Figure 18:
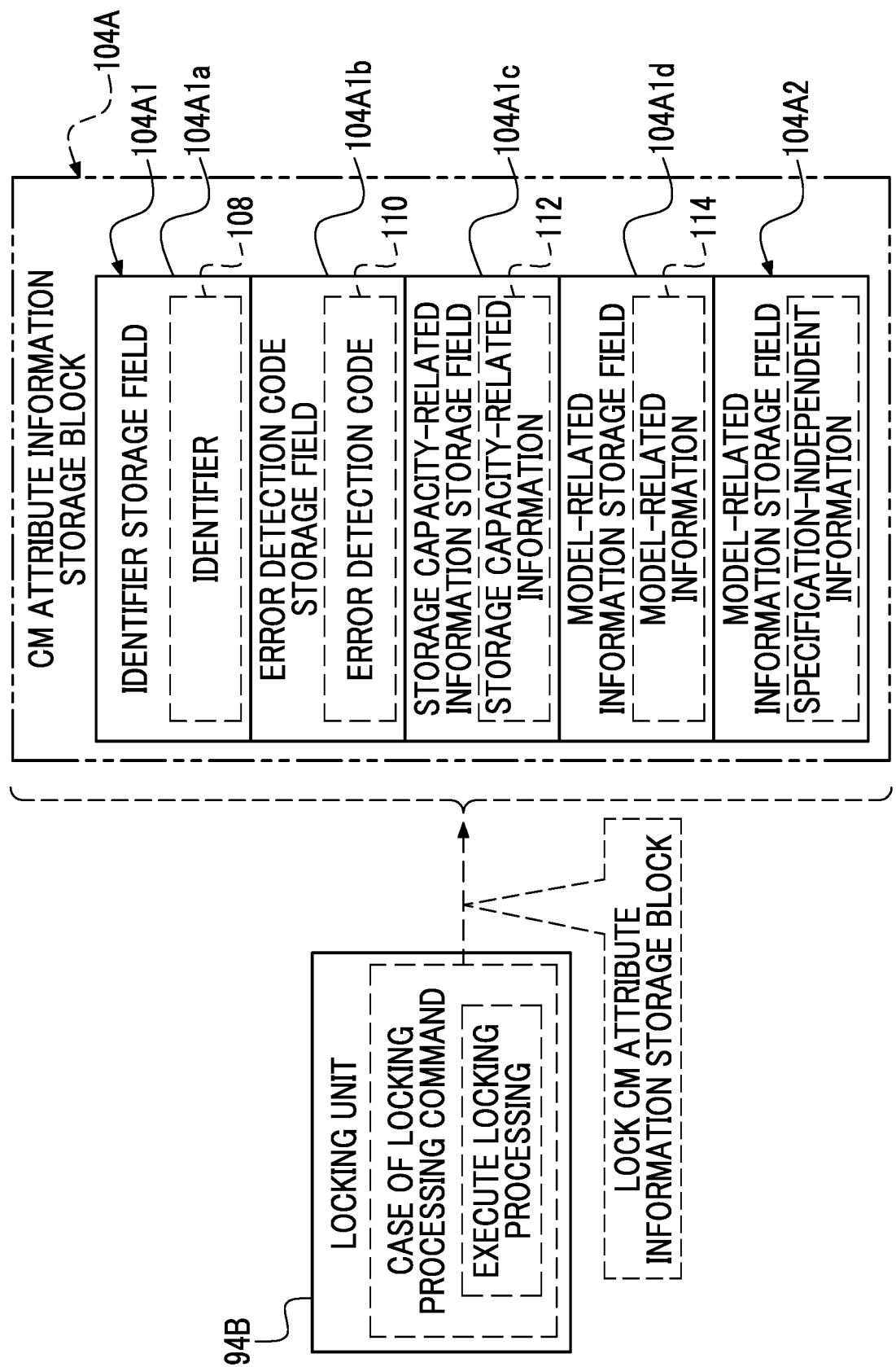
FIG. 18 is a block diagram showing an example of an aspect in which the CM attribute information storage block is locked by a locking unit.

As shown in FIG. 18 as an example, in a case where the command that is indicated by the command signal input to the locking unit 94B is the locking processing command, the locking unit 94B executes the locking processing to the CM attribute information storage block 104A. The locking processing is executed by the locking unit 94B, whereby the CM attribute information storage block 104A is locked. In the example shown in FIG. 18, the entire CM attribute information storage block 104A is locked by the locking unit 94B. With this, the identifier storage field 104A 1 a in the CM attribute information storage block 104A is locked. In this way, the CM attribute information storage block 104A is changed to a readout-dedicated block with the execution of the locking processing by the locking unit 94B.

In the example shown in FIG. 18, although an example where the identifier storage field 104A1a is locked with the locking of the entire CM attribute information storage block 104A has been described, the technique of the present disclosure is not limited thereto. For example, the specification-dependent storage field 104A1 may be locked by the locking unit 94B, or at least the identifier storage field 104A1a in the CM attribute information storage block 104A may be locked by the locking unit 94B.

Next, the operation of the cartridge memory 19 will be described referring to FIG. 19.

Figure 19:
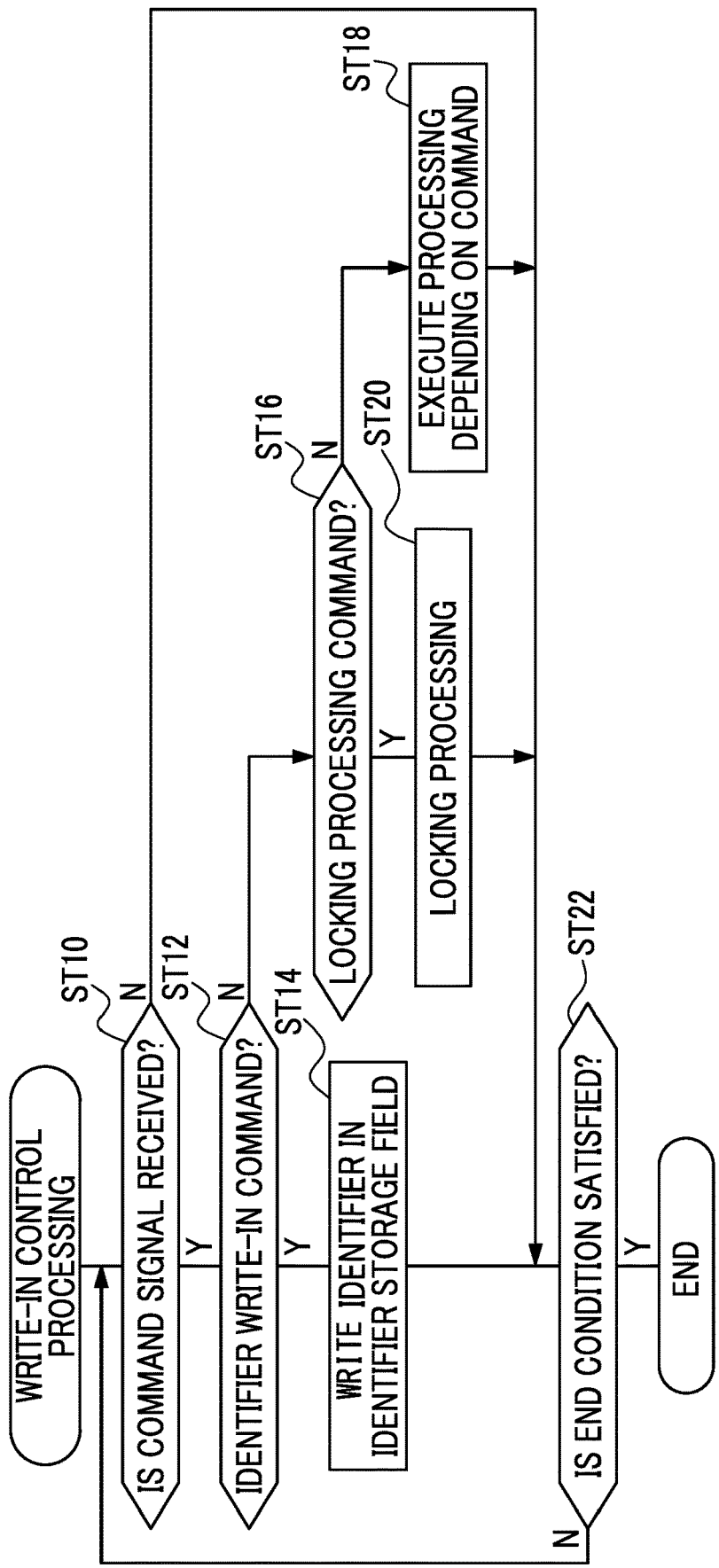
FIG. 19 is a flowchart illustrating an example of a flow of write-in control processing.

FIG. 19 shows an example of a flow of write-in control processing that is executed by the CPU 94 in the manufacturing process of the magnetic tape cartridge 10. The flow of the write-in control processing shown in FIG. 19 is an example of a "method for operating a noncontact communication medium" according to the technique of the present disclosure.

In the following description of the write-in control processing of FIG. 19, for convenience of description, a case where the cartridge memory 19 is charged in the manufacturing process of the magnetic tape cartridge 10 in a state in which the management information and the like are not stored in the plurality of storage blocks 104 will be described. In the following description of the write-in control processing of FIG. 19, for convenience of description, description will be provided on the premise that the command signal indicating the write-in command or the command signal indicating the locking processing command is transmitted from the noncontact reading and writing device 50 to the cartridge memory 19. Furthermore, in the following description of the write-in control processing of FIG. 19, for convenience of description, description will be provided on the premise that the command signal indicating the locking processing command is transmitted from the noncontact reading and writing device 50 to the cartridge memory 19 in a stage where the identifier 108 is stored in the identifier storage field 104A1a and manufacturing of the magnetic tape cartridge 10 ends.

In the write-in control processing shown in FIG. 19, first, in Step ST10, the write-in unit 94A determines whether or not the command signal transmitted from the noncontact reading and writing device 50 is received by the signal processing circuit 88. In Step ST10, in a case where the command signal is not received by the signal processing circuit 88, determination is made to be negative, and the write-in control processing proceeds to Step ST22. In Step ST10, in a case where the command signal is received by the signal processing circuit 88, determination is made to be affirmative, and the write-in control processing proceeds to Step ST12.

In Step ST12, the write-in unit 94A determines whether or not the command that is indicated by the command signal received by the signal processing circuit 88 in Step ST10 is the identifier write-in command. In Step ST12, in a case where the command that is indicated by the command signal received by the signal processing circuit 88 in Step ST10 is the identifier write-in command, determination is made to be affirmative, and the write-in control processing proceeds to Step ST14. In Step ST12, in a case where the command that is indicated by the command signal received by the signal processing circuit 88 in Step ST10 is a command other than the identifier write-in command, determination is made to be negative, and the write-in control processing proceeds to Step ST16.

In Step ST14, the write-in unit 94A writes the identifier 108 that is included in the command signal received by the signal processing circuit 88 in Step ST10, in the identifier storage field 104A1a, and thereafter, the write-in control processing proceeds to Step ST22.

In a case where the identifier 108 is stored in the identifier storage field 104A1a in a stage before the locking processing of Step ST20 described below is executed, and in a case where the processing of Step ST14 is executed by the write-in unit 94A, the identifier 108 in the identifier storage field 104A1a is changed to the identifier 108 that is included in the latest command signal received in Step ST10.

In Step ST16, the write-in unit 94A determines whether or not the command that is indicated by the command signal received by the signal processing circuit 88 in Step ST10 is the locking processing command. In Step ST16, in a case where the command that is indicated by the command signal received by the signal processing circuit 88 in Step ST10 is a command other than the locking processing command, determination is made to be negative, and the write-in control processing proceeds to Step ST18. In Step ST16, in a case where the command that is indicated by the command signal received by the signal processing circuit 88 in Step ST10 is the locking processing command, determination is made to be affirmative, and the write-in control processing proceeds to Step ST20.

In Step ST18, the write-in unit 94A executes write-in processing depending on the write-in command that is indicated by the command signal received by the signal processing circuit 88 in Step ST10, and thereafter, the write-in control processing proceeds to Step ST22. Here, the write-in processing depending on the write-in command indicates the write-in command (for example, the error detection code write-in command, the storage capacity-related information write-in command, the model-related information write-in command, or the specification-independent information write-in command) other than the identifier write-in command.

In Step ST20, the locking unit 94B executes the locking processing to the CM attribute information storage block 104A to lock the CM attribute information storage block 104A, and thereafter, the write-in control processing proceeds to Step ST22. The CM attribute information storage block 104A is changed to a readout-dedicated block with the execution of the processing of Step ST20, and hereinafter, rewriting of information to the CM attribute information storage block 104A is disabled.

In Step ST22, the write-in unit 94A determines whether or not a condition (hereinafter, referred to as a "write-in control processing end condition") for ending the write-in control processing is satisfied. Examples of the write-in control processing end condition include a condition that the magnetic field MF disappears or a condition that a command signal indicating a command to end the write-in control processing is transmitted from the noncontact reading and writing device 50 to the cartridge memory 19. Determination about whether or not the magnetic field MF disappears is performed by the CPU 94 based on the intensity of the magnetic field MF measured by a magnetic field intensity measurement circuit (not shown) capable of measuring the intensity of the magnetic field MF.

In Step ST22, in a case where the write-in control processing end condition is not satisfied, determination is made to be negative, and the write-in control processing proceeds to Step ST10. In Step ST22, in a case where the write-in control processing end condition is satisfied, determination is made to be affirmative, and the write-in control processing ends.

As described above, the cartridge memory 19 has the CM attribute information storage block 104A where the specification-dependent information is stored. The CM attribute information storage block 104A has the identifier storage field 104A1a. Here, the identifier 108 given from the noncontact reading and writing device 50 to the cartridge memory 19 is written in the identifier storage field 104A1a by the write-in unit 94A. Then, the identifier storage field 104A1a is locked by the locking unit 94B in response to the locking processing command given from the noncontact reading and writing device 50 to the cartridge memory 19. Therefore, according to this configuration, it is possible to fix the identifier 108 determined by the vendor of the magnetic tape cartridge 10 at a timing intended by the vendor of the magnetic tape cartridge 10.

With this, for example, it is possible to give an individual consecutive number to each of the cartridge memory 19 that is incorporated in the LTO and the cartridge memory 19 that is incorporated in the IBM3592. Accordingly, for example, it is possible to suppress a shortage of the identifier that is given to the cartridge memory 19, due to exhaustion of the consecutive number, compared to a case where the consecutive number having a limited number of digits is given to the cartridge memory 19 that is incorporated in the LTO and the and the cartridge memory 19 that is incorporated in the IBM3592, as the identifier (for example, a serial number for manufacturing) by a vendor of the cartridge memory 19.

In the cartridge memory 19, the identifier storage field 104A 1 a is locked with the locking of the CM attribute information storage block 104A. Therefore, according to this configuration, it is possible to collectively bring not only the identifier 108 but also the CM attribute information stored in the CM attribute information storage block 104A into an unrewritable state. Furthermore, it is possible to easily lock the identifier storage field 104A1a, compared to a case where only the identifier storage field 104A1a in the CM attribute information storage block 104A is selected and locked.

In the cartridge memory 19, the CM attribute information storage block 104A is changed to a readout-dedicated block with the locking of the CM attribute information storage block 104A. Therefore, according to this configuration, it is possible to inhibit rewriting of the CM attribute information after the CM attribute information storage block 104A is locked. Inhibiting the rewriting of the CM attribute information means that rewriting of the identifier 108 is also inhibited.

In the cartridge memory 19, in a case where the identifier write-in command is given from the noncontact reading and writing device 50 to the cartridge memory 19 in a state in which the identifier 108 is stored in the identifier storage field 104A1a in a stage before the locking processing is executed, the identifier 108 of the identifier storage field 104A 1 a is changed by the write-in unit 94A. Therefore, according to this configuration, it is possible to change the identifier 108 stored in the identifier storage field 104A 1 a to the identifier 108 intended by the vendor of the magnetic tape cartridge 10 before the identifier storage field 104A 1 a is locked.

In the cartridge memory 19, the CM attribute information storage block 104A is a block having the identifier storage field 104A1a, the error detection code storage field 104A1b, the storage capacity-related information storage field 104A1c, and the model-related information storage field 104A1d. Then, the CM attribute information storage block 104A is locked by the locking unit 94B. Therefore, according to this configuration, it is also possible to lock the error detection code storage field 104A1b, the storage capacity-related information storage field 104A1c, and the model-related information storage field 104A1d at a timing at which identifier storage field 104A1a is locked.

In the cartridge memory 19, the write-in control processing is executed by the CPU 94 in a stage where the manufacturing of the magnetic tape cartridge 10 ends. The locking processing (see Step ST20 shown in FIG. 19) is included in the write-in control processing. That is, the locking processing is executed by the locking unit 94B in a stage where the manufacturing of the magnetic tape cartridge 10 ends. Therefore, according to this configuration, it is possible to lock the identifier storage field 104A1a at a timing at which no problem occurs even though the identifier storage field 104A1a is locked by the vendor of the magnetic tape cartridge 10. Alternatively, the locking processing may be executed by the locking unit 94B in a stage where the inspection of the magnetic tape cartridge 10 ends or a stage where the magnetic tape cartridge 10 is shipped. Even in this case, it is possible to lock the identifier storage field 104A1a at a timing at which no problem occurs even though the identifier storage field 104A1a is locked by the vendor of the magnetic tape cartridge 10.

In the above-described embodiment, although a form example where the locking processing is executed by the locking unit 94B under a condition that the locking processing command is given to the cartridge memory 19 has been shown, the technique of the present disclosure is not limited thereto. On the premise that a flag (hereinafter, simply referred to as a "flag") indicating permission of the locking processing is turned on, the locking processing may be executed in a case where the locking processing command is given to the cartridge memory 19.

Figure 20:
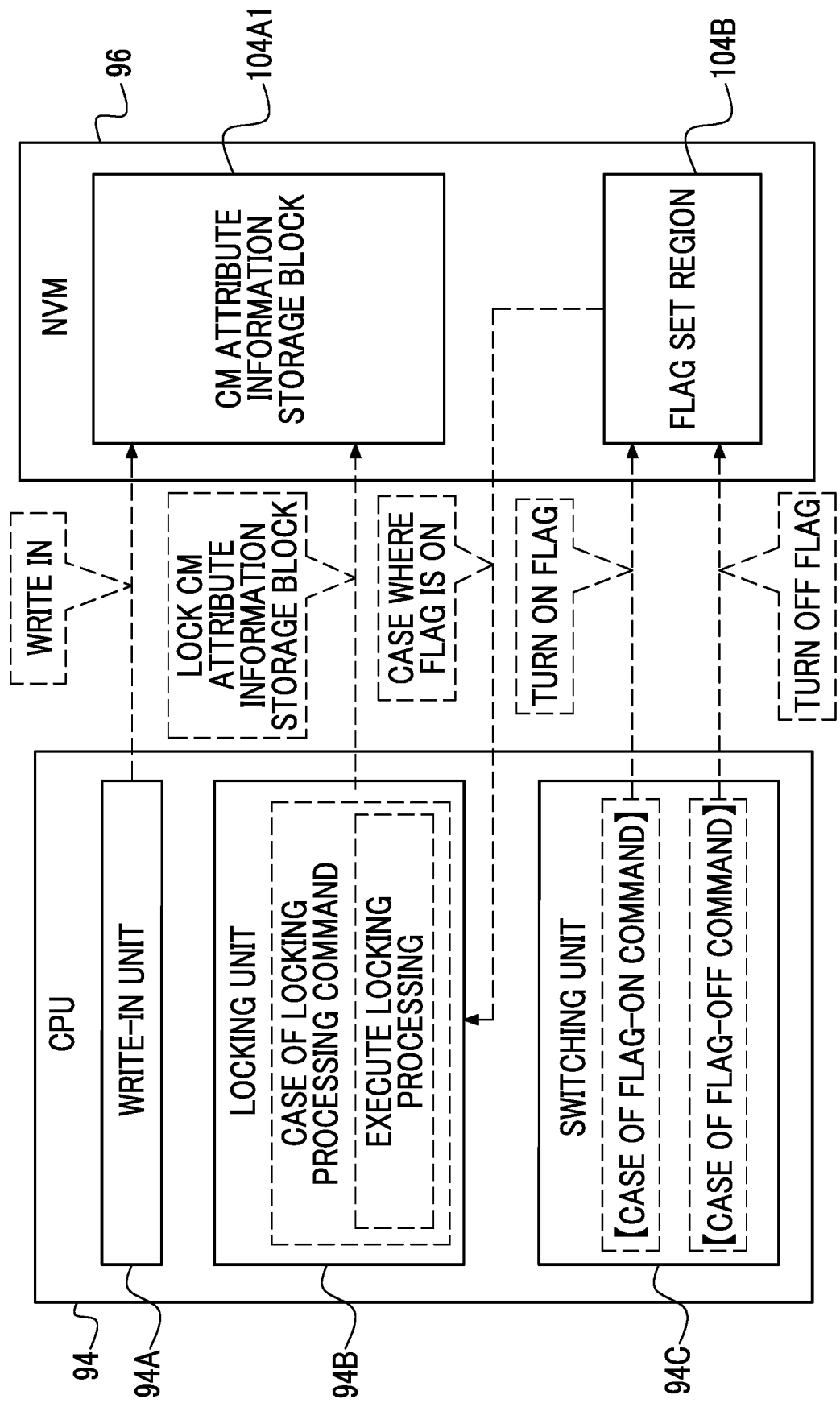
FIG. 20 is a block diagram showing an example of processing contents of the write-in unit, the locking unit, and a switching unit.

In this case, as shown in FIG. 20 as an example, the CPU 94 also operates as a switching unit 94C in addition to the write-in unit 94A and the locking unit 94B. The NVM 96 has a flag setting region 104B. The flag setting region 104B is a storage region where the flag is set. Here, although a storage region of the NVM 96 has been illustrated as the flag setting region 104B, the technique of the present disclosure is not limited thereto, and for example, a storage region of the RAM 98 may be used as the flag setting region 104B or an internal memory of the CPU 94 may be used as the flag setting region 104B.

The switching unit 94C switches between on and off of the flag in response to an instruction given from an outside. In more detail, for example, in a case where a command signal indicating a command (hereinafter, referred to as a "flag-on command") to turn on the flag is transmitted from the noncontact reading and writing device 50 to the cartridge memory 19, the switching unit 94 turns on the flag of the flag setting region 104B. For example, in a case where a command signal indicating a command (hereinafter, referred to as a "flag-off command)" to turn off the flag is transmitted from the noncontact reading and writing device 50 to the cartridge memory 19, the switching unit 94 turns off the flag of the flag setting region 104B.

The locking unit 94B locks the CM attribute information storage block 104A in a case where the flag of the flag setting region 104B is on, and the locking processing command is given from the noncontact reading and writing device 50 that is an example of the "outside" according to the technique of the present disclosure, to the cartridge memory 19. Here, although a form example where the CM attribute information storage block 104A is locked by the locking unit 94B has been described, the technique of the present disclosure is not limited thereto, and at least the identifier storage field 104A1a in the CM attribute information storage block 104A may be locked by the locking unit 94B.

Figure 21:
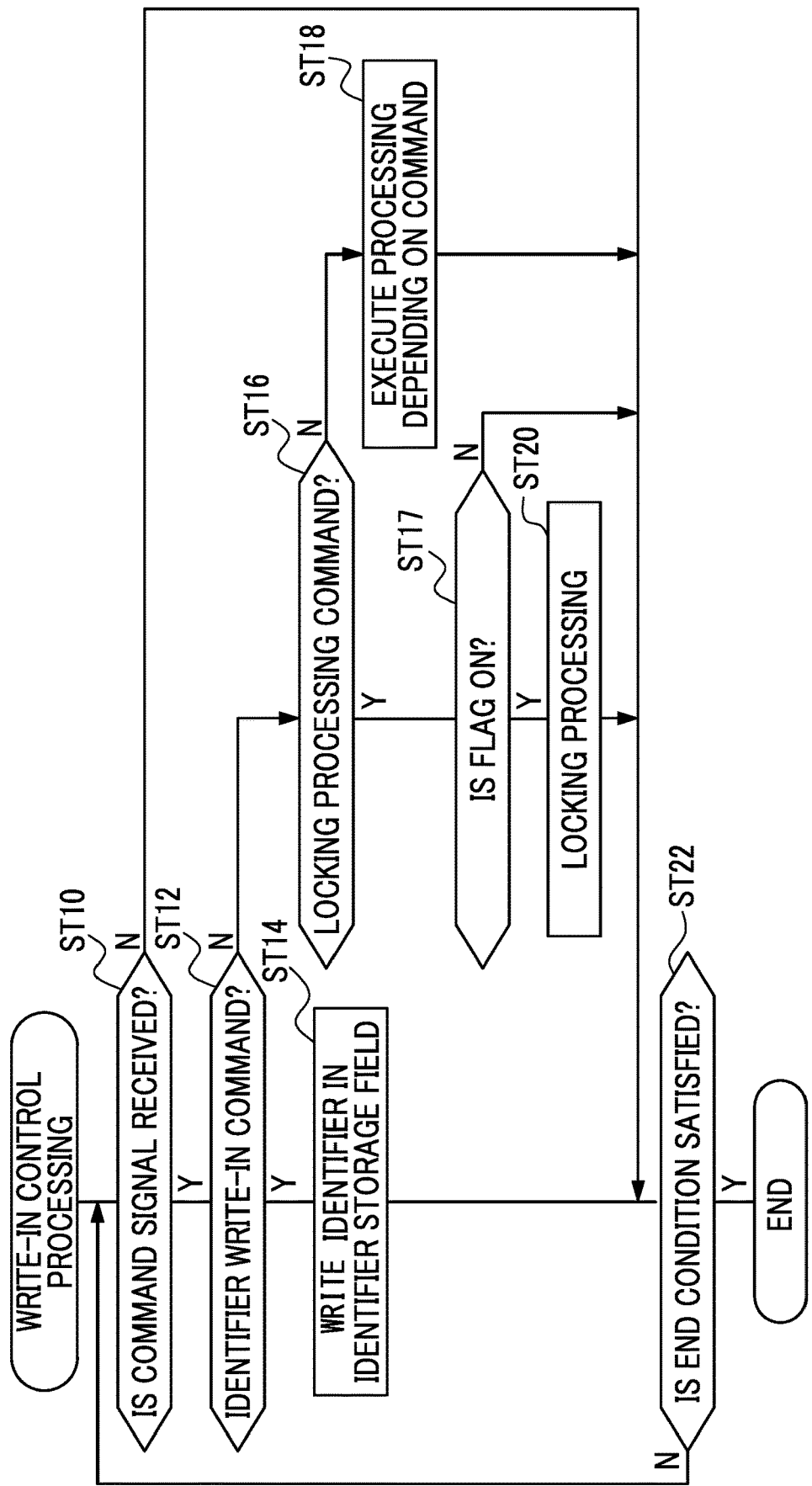
FIG. 21 is a flowchart illustrating a first modification example of a flow of write-in control processing.

In this way, the CPU 94 executes the write-in control processing shown in FIG. 19 as an example in a state in which the flag is turned on or off by the switching unit 94C in response to the locking processing command given from the noncontact reading and writing device 50 to the cartridge memory 19. A flowchart shown in FIG. 21 is different from the flowchart shown in FIG. 19 in that the processing of Step ST17 is provided. Step ST17 is provided between Steps ST16 and ST20.

In the write-in control processing shown in FIG. 19, in Step ST17, the locking unit 94B determines whether or not the flag of the flag setting region 104B is turned on. In Step ST17, in a case where the flag of the flag setting region 104B is turned off, determination is made to be negative, and the write-in control processing proceeds to Step ST22. In Step ST17, in a case where the flag of the flag setting region 104B is turned on, determination is made to be affirmative, and the write-in control processing proceeds to Step ST20. That is, in a case where the command that is indicated by the command signal received in Step ST10 is the locking processing command (Step ST16: Y), and the flag of the flag setting region 104B is turned on (Step ST17: Y), in Step ST20, the locking unit 94B executes the locking processing like the example shown in FIG. 19.

With this, it is possible to suppress the locking of the identifier storage field 104A1a at a timing not intended by the vendor of the magnetic tape cartridge 10, compared to a case where the identifier storage field 104A1a is necessarily locked in a case where the locking processing command is given from the noncontact reading and writing device 50 to the cartridge memory 19.

In the above-described embodiment, although a form example where the locking processing is executed by the locking unit 94B under the condition that the locking processing command is given from the noncontact reading and writing device 50 to the cartridge memory 19 has been described, the technique of the present disclosure is not limited thereto. For example, the locking processing may be executed by the locking unit 94B under a condition that the error detection code 110 is stored in the error detection code storage field 104A1b in response to the error detection code write-in command given from the noncontact reading and writing device 50 to the cartridge memory 19. In this case, the error detection code write-in command given from the noncontact reading and writing device 50 to the cartridge memory 19 is an example of a "specific command" according to the technique of the present disclosure.

Figure 22:
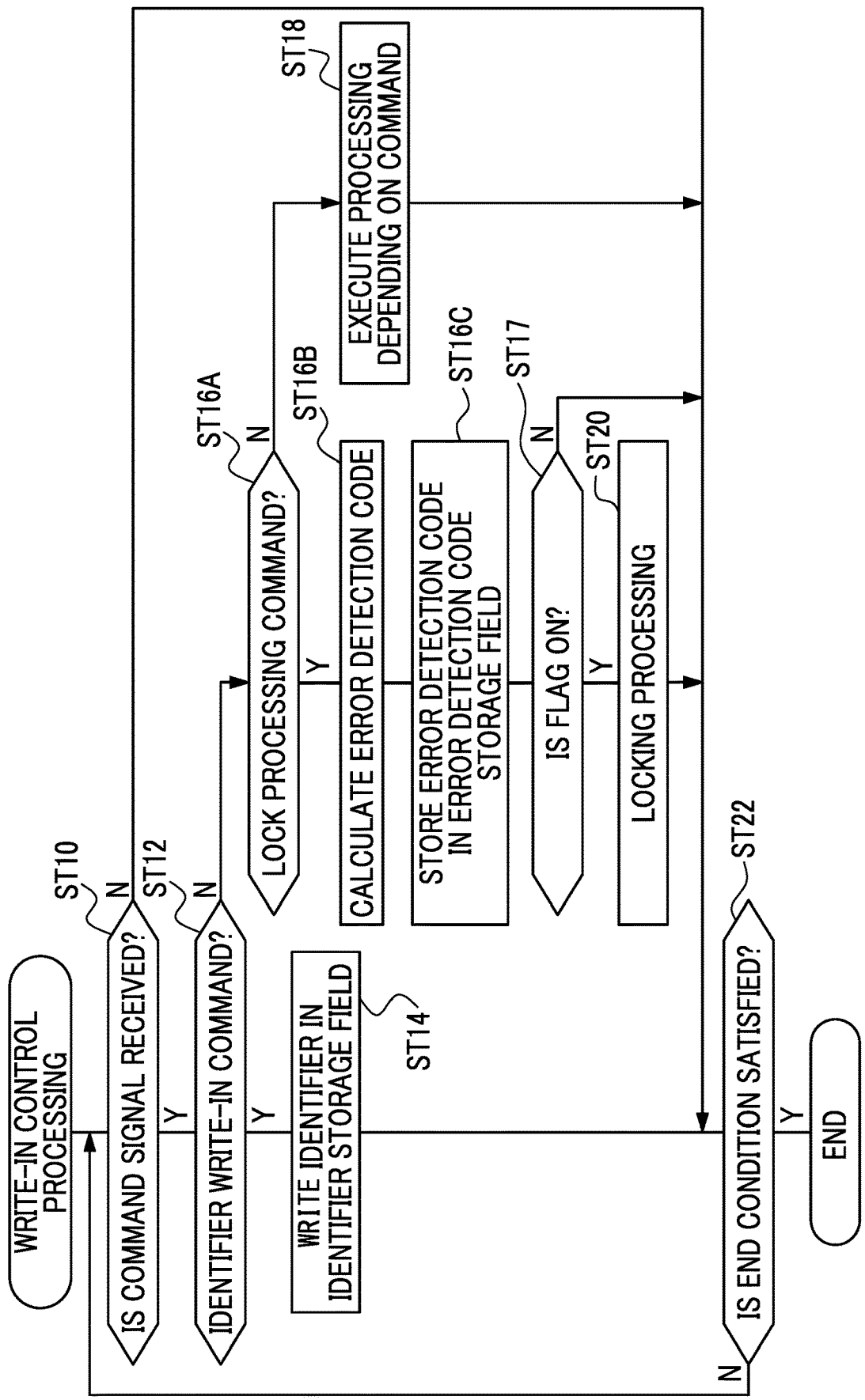
FIG. 22 is a flowchart illustrating a second modification example of a flow of write-in control processing.

In this way, in a case where the locking processing is executed by the locking unit 94B under the condition that the error detection code 110 is stored in the error detection code storage field 104A1b, for example, write-in control processing shown in FIG. 22 is executed by the CPU 94. Hereinafter, the write-in control processing shown in FIG. 22 will be described.

The flowchart shown in FIG. 22 is different from the flowchart shown in FIG. 21 in that processing of Step ST16A, processing of Step ST16B, and processing of Step ST16C are provided instead of the processing of Step ST16. In the following description of the write-in control processing of FIG. 22, for convenience of description, description will be provided on the premise that, in a case where the identifier 108 is stored in at least the identifier storage field 104A1a among the plurality of storage fields in the CM attribute information storage block 104A, the command signal indicating the error detection code write-in command is transmitted from the noncontact reading and writing device 50 to the cartridge memory 19.

In the write-in control processing shown in FIG. 22, in Step ST16A, the write-in unit 94A determines whether or not the command that is indicated by the command signal received in Step ST10 is the error detection code write-in command. In Step ST16A, in a case where the command that is indicated by the command signal received in Step ST10 is a write-in command other than the error detection code write-in command, determination is made to be negative, and the write-in control processing proceeds to Step ST18. In Step ST16A, in a case where the command that is indicated by the command signal received in Step ST10 is the error detection code write-in command, determination is made to be affirmative, and the write-in control processing proceeds to Step ST16B.

In Step ST16B, the write-in unit 94A calculates the error detection code 110 for the identifier 108 stored in the identifier storage field 104A1a, and thereafter, the write-in control processing proceeds to Step ST16C.

In Step ST16C, the write-in unit 94A writes the error detection code 110 calculated in Step ST16B in the error detection code storage field 104A1b, and thereafter, the write-in control processing proceeds to Step ST17. In Steps ST17 and ST20, the same processing as the processing shown in FIG. 21 is executed, and accordingly, the CM attribute information storage block 104A is locked.

Therefore, according to this configuration, it is possible to reduce labor for an operation to set the error detection code 110 and an operation of the locking processing, compared to a case where the operation to set the error detection code 110 and the operation of the locking processing are performed individually. A timing at which the error detection code 110 is set is mostly the stage where the manufacturing of the magnetic tape cartridge 10 ends, the stage where the inspection of the magnetic tape cartridge 10 ends, or a stage where the magnetic tape cartridge 10 is shipped. For this reason, it is possible to suppress the locking of the identifier storage field 104A1a at a timing not intended by the vendor of the magnetic tape cartridge 10, compared to a case where the identifier storage field 104A1a is necessarily locked in a case where the locking processing command is given from the noncontact reading and writing device 50 to the cartridge memory 19.

Figure 23:
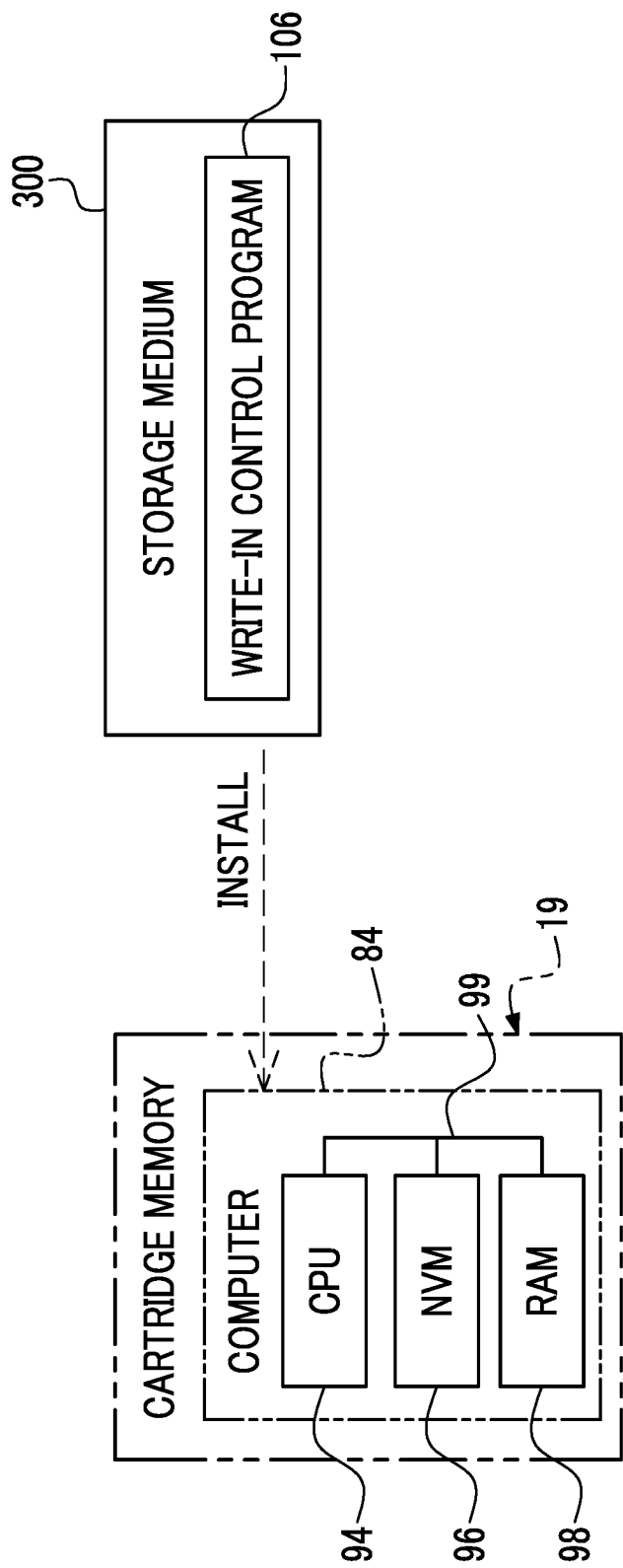
FIG. 23 is a block diagram showing an example of an aspect in which a write-in control processing program is installed on a computer from a storage medium in which the write-in control processing program is stored.

In the above-described embodiment, although a form example where the write-in control program 106 is stored in the NVM 96 has been described, the technique of the present disclosure is not limited thereto. For example, as shown in FIG. 23, the write-in control program 106 may be stored in a storage medium 300. The storage medium 300 is a non-transitory storage medium. An example of the storage medium 300 is any portable storage medium, such as an SSD or a USB memory.

The write-in control program 106 that is stored in the storage medium 300 is installed on the computer 84. The CPU 94 executes the write-in control processing following the write-in control program 106. In an example shown in FIG. 23, the CPU 94 is a single CPU, but may be a plurality of CPUs.

The write-in control program 106 may be stored in a storage unit of another computer, a server apparatus, or the like that is connected to the computer 84 through a communication network (not shown), and the write-in control program 106 may be downloaded depending on a request from the cartridge memory 19 and may be installed on the computer 84.

In the example shown in FIG. 23, although the computer 84 has been illustrated, the technique of the present disclosure is not limited thereto, and a device including an ASIC, an FPGA, or a PLD may be applied instead of the computer 84. Alternatively, a combination of a hardware configuration and a software configuration may be used instead of the computer 84.

As a hardware resource that executes the write-in control processing, various processors described below can be used. Examples of the processors include a CPU that is a general-purpose processor configured to execute software, that is, a program to function as the hardware resource that executes the write-in control processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the write-in control processing.

The hardware resource executing the write-in control processing may be configured of one of various processors or may be configured of a combination of two or more processors (for example, a combination of a plurality of FPGAs or a combination of a CPU and an FPGA) of the same type or different types. The hardware resource that executes the write-in control processing may be one processor.

As an example where the hardware resource is configured with one processor, first, there is a form in which one processor is configured with a combination of one or more CPUs and software, and the processor functions as the hardware resource that executes the write-in control processing. Second, as represented by SoC or the like, there is a form in which a processor that realizes all functions of a system including a plurality of hardware resources, which execute the write-in control processing, with one IC chip is used. In this way, the write-in control processing is realized using one or more of various processors described above as the hardware resource.

In addition, as the hardware structures of various processors, more specifically, an electric circuit into which circuit elements, such as semiconductor elements, are combined can be used. The above-described write-in control processing is merely an example. Accordingly, it is needless to say that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A noncontact communication medium comprising:
a processor; and
a memory incorporated in or connected to the processor,
wherein the noncontact communication medium performs noncontact communication with an external communication device,
the memory has a storage block where information determined depending on a specification of a magnetic tape cartridge, in which the noncontact communication medium is mounted, is stored,
the storage block has an identifier storage field where an identifier specifying the noncontact communication medium is stored, and
the processor is configured to:
write the identifier given from the external communication device to the noncontact communication medium by noncontact communication, in the identifier storage field,
execute locking processing of locking the identifier storage field in response to a specific command given from the external communication device to the noncontact communication medium by the noncontact communication, and
switch between on and off of a flag indicating permission of the locking processing in response to an external instruction.

2. The noncontact communication medium according to claim 1,
wherein the locking processing is processing of locking the storage block to lock the identifier storage field.

3. The noncontact communication medium according to claim 2,
wherein the storage block is changed to a readout-dedicated block through the locking processing by the processor.

4. The noncontact communication medium according to claim 1,
wherein the processor is configured to change the identifier in the identifier storage field in response to an instruction given from the external communication device to the noncontact communication medium by the noncontact communication in a case where the identifier is stored in the identifier storage field in a stage before the locking processing is executed.

5. The noncontact communication medium according to claim 1,
wherein the processor is configured to
store an error detection code for information including the identifier stored in the memory, in the memory in response to the specific command, and
execute the locking processing under a condition that the error detection code is stored in the memory.

6. The noncontact communication medium according to claim 1,
wherein the storage block is a block having the identifier storage field, an error detection code storage field where a code for error detection for information including the identifier is stored, a storage capacity-related information storage field where information regarding a storage capacity of the memory is stored, and a model-related information storage field where information regarding a model of the noncontact communication medium is stored.

7. The noncontact communication medium according to claim 1,
wherein the locking processing is executed in a stage where manufacturing of the magnetic tape cartridge ends, a stage where inspection of the magnetic tape cartridge ends, or a stage where the magnetic tape cartridge is shipped.

8. A magnetic tape cartridge comprising:
the noncontact communication medium according to claim 1; and
a magnetic tape,
wherein the memory stores management information regarding the magnetic tape.

9. A method for operating a noncontact communication medium that includes a memory incorporated in or connected to a processor and performs noncontact communication with an external communication device,
in which the memory has a storage block where information determined depending on a specification of a magnetic tape cartridge, in which the noncontact communication medium is mounted, is stored, and
the storage block has an identifier storage field where an identifier capable of specifying the noncontact communication medium is stored,
the method comprising:
writing the identifier given from the external communication device to the noncontact communication medium by the noncontact communication in the identifier storage field;
executing locking processing of locking the identifier storage field in response to a specific command given from the external communication device to the noncontact communication medium by the noncontact communication; and
switching between on and off of a flag indicating permission of the locking processing in response to an external instruction.

10. A non-transitory computer-readable storage medium storing a program executable by a computer, which is applied to a noncontact communication medium that includes a memory incorporated in or connected to a processor and performs noncontact communication with an external communication device, to perform a process,
in which the memory has a storage block where information determined depending on a specification of a magnetic tape cartridge, in which the noncontact communication medium is mounted, is stored, and
the storage block has an identifier storage field where an identifier specifying the noncontact communication medium is stored,
the process comprising:
writing the identifier given from the external communication device to the noncontact communication medium by the noncontact communication in the identifier storage field;
executing locking processing of locking the identifier storage field in response to a specific command given from the external communication device to the noncontact communication medium by the noncontact communication; and
switching between on and off of a flag indicating permission of the locking processing in response to an external instruction.

* * * * *